United States Patent
Chaffins et al.

(10) Patent No.: US 11,738,508 B2
(45) Date of Patent: Aug. 29, 2023

(54) THREE-DIMENSIONAL PRINTING

(71) Applicant: HEWLETT-PACKARD DEVELOPMENT COMPANY, L.P., Spring, TX (US)

(72) Inventors: Sterling Chaffins, Corvallis, OR (US); Kevin P DeKam, Corvallis, OR (US); Kristopher J Erickson, Palo Alto, CA (US); Cory J Ruud, Corvallis, OR (US); Jami Ryan Barone, Corvallis, OR (US); Ruhua Cai, Corvallis, OR (US); Anthony J Galvan, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 236 days.

(21) Appl. No.: 16/756,364

(22) PCT Filed: Nov. 17, 2017

(86) PCT No.: PCT/US2017/062338
§ 371 (c)(1),
(2) Date: Apr. 15, 2020

(87) PCT Pub. No.: WO2019/099030
PCT Pub. Date: May 23, 2019

(65) Prior Publication Data
US 2020/0269501 A1    Aug. 27, 2020

(51) Int. Cl.
*B29C 64/165*    (2017.01)
*C08K 3/08*    (2006.01)
(Continued)

(52) U.S. Cl.
CPC .............. *B29C 64/165* (2017.08); *C08K 3/08* (2013.01); *C08L 77/02* (2013.01); *B33Y 10/00* (2014.12);
(Continued)

(58) Field of Classification Search
CPC .......... B29C 64/165; C08K 2003/0806; C08K 2201/001; C08K 2201/005; C08K 3/042;
(Continued)

(56) References Cited

U.S. PATENT DOCUMENTS

| 6,363,606 B1 | 4/2002 | Johnson, Jr. et al. |
| 6,508,980 B1 | 1/2003 | Sachs et al. |

(Continued)

FOREIGN PATENT DOCUMENTS

| EP | 2883922 A1 | 6/2015 | |
| EP | 3572217 A1 * | 11/2019 | ........... B29C 64/165 |

(Continued)

OTHER PUBLICATIONS

Dong, Y., et al., Facile Synthesis of High Silver Content Mod Ink by Using Sliver Oxalate Precursor for Inkjet Printing Applications.
(Continued)

*Primary Examiner* — Mark Kopec
*Assistant Examiner* — Jaison P Thomas
(74) *Attorney, Agent, or Firm* — HP Inc. Patent Department

(57) ABSTRACT

In an example, a composition for three-dimensional (3D) printing includes a polymer build material and a non-conductive fusing agent dispensable onto the polymer build material to form a polymer-fusing agent composite portion when heated to a sintering temperature, a conductive agent dispensable onto on the polymer build material to form a polymer-conductive agent composite portion when heated at least to the sintering temperature, the conductive agent
(Continued)

comprising: at least one conductive particulate present in an amount of from about 10% to about 60% of a total weight of the conductive agent; at least one co-solvent present in an amount of from about 10% to about 50% of a total weight of the conductive agent; and an additive present in an amount of from about 0% to about 10% of a total weight of the conductive agent.

15 Claims, 8 Drawing Sheets

(51) Int. Cl.
  *C08L 77/02*   (2006.01)
  *B33Y 10/00*   (2015.01)
  *B33Y 70/00*   (2020.01)
  *C08K 3/04*    (2006.01)

(52) U.S. Cl.
  CPC .............. *B33Y 70/00* (2014.12); *C08K 3/042* (2017.05); *C08K 2003/0806* (2013.01); *C08K 2201/001* (2013.01); *C08K 2201/005* (2013.01)

(58) Field of Classification Search
  CPC ........... C08K 3/08; C08L 77/02; B33Y 10/00; B33Y 70/00
  See application file for complete search history.

(56) References Cited

U.S. PATENT DOCUMENTS

| | | | |
|---|---|---|---|
| 7,922,939 B2 | 4/2011 | Lewis et al. | |
| 10,731,044 B2* | 8/2020 | Ganapathiappan | C09D 11/328 |
| 2007/0289483 A1 | 12/2007 | Cho et al. | |
| 2015/0037550 A1 | 2/2015 | Balasubramaniam et al. | |
| 2017/0239889 A1* | 8/2017 | Ganapathiappan | C09D 11/033 |
| 2019/0047216 A1* | 2/2019 | Emamjomeh | B29C 64/165 |
| 2019/0242758 A1* | 8/2019 | DeKam | H05K 1/09 |
| 2019/0275735 A1* | 9/2019 | Lee | C08L 71/00 |

FOREIGN PATENT DOCUMENTS

| | | | | |
|---|---|---|---|---|
| WO | 2015/165363 A1 | 11/2015 | | |
| WO | 2016/012486 A1 | 1/2016 | | |
| WO | WO-2016048380 A1 * | 3/2016 | ........... | B29C 64/165 |
| WO | WO-2017069778 A1 | 4/2017 | | |
| WO | 2017/086995 A1 | 5/2017 | | |
| WO | 2017/103797 A1 | 6/2017 | | |
| WO | WO-2017131652 A1 * | 8/2017 | ........... | B29C 64/165 |
| WO | WO-2017180164 A1 * | 10/2017 | .............. | B22F 10/00 |
| WO | WO-2017189306 A1 | 11/2017 | | |

OTHER PUBLICATIONS

Hwan, Ko. S et al., Metal Nanoparticle Direct Inkjet Printing for Low-temperature 3D Micro Metal Structure Fabrication, Nov. 9, 2010, http://iopscience.iop.org/article/10.1088/0960-1317/20/12/125010/meta.

Sowade, E. et al., Roll-to-Roll Infrared (IR) Drying and Sintering of an Inkjet-printed Silver Nanoparticie Ink Within1 Second, Sep. 22, 2015 https://pubs.rsc.org/en/content/articlehtml/2015/tc/c5tc02291f#divabstract.

Bai, J. G. et al., "Inkjet Printable Nanosilver Suspensions for Enhanced Sintering Quality in Rapid Manufacturing", Nanotechnology, Apr. 5, 2007, vol. 18, No. 18, 3 pages.

Hoerber, J., et al., "Approaches for Additive Manufacturing of 3D Electronic Applications", Procedia CIRP, 2014, vol. 17, pp. 806-811.

* cited by examiner

THREE-DIMENSIONAL PRINTING

BACKGROUND

Three-dimensional (3D) printing may be an additive printing process used to make three-dimensional solid parts from a digital model. 3D printing may be used in product prototyping, mold generation, mold master generation, and manufacturing. Some 3D printing techniques are considered additive processes because they involve the application of successive layers of components.

BRIEF DESCRIPTION OF THE DRAWINGS

Features of examples of the present disclosure will become apparent by reference to the following detailed description and drawings, in which like reference numerals correspond to similar, though perhaps not identical, components. For example, reference numeral 116 may refer to element 116 in FIG. 1 and an analogous element may be identified by reference numeral 216 in FIG. 2. For the sake of brevity, reference numerals or features having a previously described function may or may not be described in connection with other drawings in which they appear.

DETAILED DESCRIPTION

Figure 1:
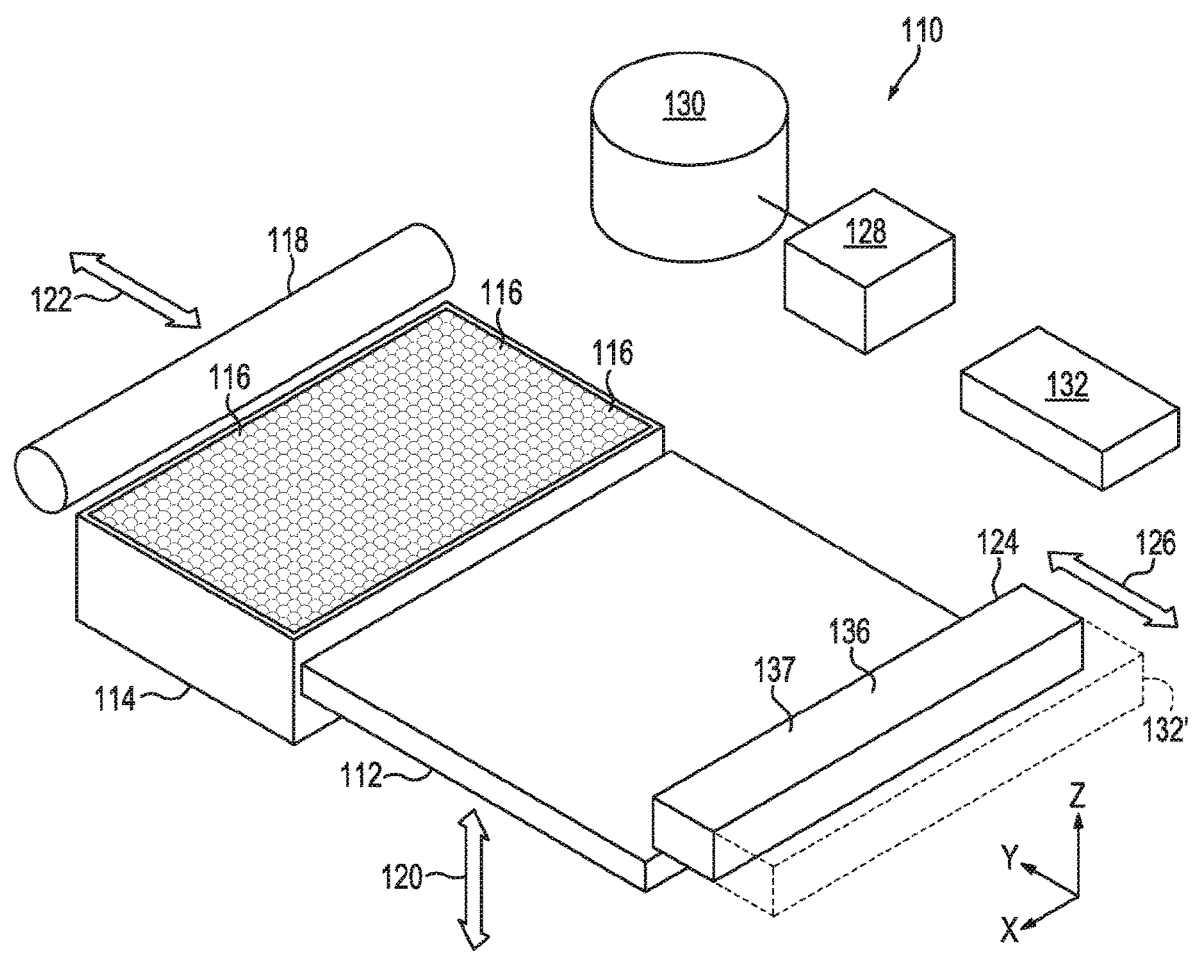
FIG. 1 is a simplified isometric view of an example of a 3D printing system disclosed herein.

Some 3D printing approaches employ conductive material to create 3D parts with polymer-conductive agent composite portion s. However, some conductive materials suitable for 3D printing may result in 3D parts that can have certain electrical characteristics and/or some 3D printing approaches may employ additional agents such as a pretreat agent (e.g., a salt pretreat agent) and/or a post-treat agent to chemically activate/produce final parts. As such, the final parts may have 1) certain electrical characteristic (e.g., a low electrical conductivity), and/or 2) experience high electrical characteristic variability with changes in relative humidity due to the presence of various components such as salt pretreat agents. Having a certain electrical characteristic and/or a high electrical characteristic variability may render the final parts unfit for inclusion in and/or use as a circuit board and/or a conductive trace. Production of the final part may entail long processing times and/or high processing temperatures due to a high percentage of liquid and/or due to a high melt temperature of a polymer employed during production of final parts. Therefore, a demand exists for printed parts that are readily processed, have a high conductivity, and/or stable resistivity over differences in relative humidity. Moreover, a demand exists for readily producing printed parts which have a degree of fusing that can be readily varied, for instance, depending upon an end application of the printer part.

As used herein, the term "substantially free of pretreat agents" refers to be being free of pretreat agent such as those including a salt (for example a metal salt) and/or an oxide of a metal salt. In various examples, a composition for 3D printing can include from about 2.0 wt % to about 2.5 wt % percent pretreat agent based on a total weight of the composition for 3D printing, or about 0.5 wt % to about 2.5 wt % percent pretreat agent based on a total weight of the composition for 3D printing, or about 1.0 wt % to about 2.5 wt % percent pretreat agent based on a total weight of the composition for 3D printing, or about 0.5 wt % % to about 2.0 wt % percent pretreat agent based on a total weight of the composition for 3D printing, or less than about 3.0 wt % percent pretreat agent based on a total weight of the composition for 3D printing, or less than about 2.0 wt % percent pretreat agent based on a total weight of the composition for 3D printing, or less than about 1.0 wt % percent pretreat agent based on a total weight of the composition for 3D printing. It is understood that the composition for 3D printing herein can be thermally bound, as detailed herein, to produce a final part having a particular electrical characteristic (e.g., electrical conductivity), in contrast to those approaches that employ pretreat agents and are chemically bound.

As used herein, the term "3D printed polymer-particulate composite" refers to a patterned 3D printed polymer-particulate composite that has been exposed to a sintering process, as detailed herein. It is understood that the polymer build material that is patterned with a conductive agent can, in some examples, be patterned with a fusing agent to improve heat absorption or alter other properties. Alternatively or in addition, it is understood that in some examples a portion of the polymer build material can be patterned with non-conductive fusing agent. For instance, in some examples a portion of the polymer build material may be patterned with the non-conductive fusing agent but not patterned with the conductive agent to form a polymer-fusing agent composite portion of final 3D printed polymer-particulate composite. As detailed herein, the final 3D printed polymer-particulate composite may include polymer build material that is substantially fused, substantially partially fused, or remains substantially unfused. The final 3D printed polymer-particulate composite may include a polymer-fusing agent composite portion (non-conductive fusing agent without the conductive agent present) and a polymer-conductive agent composite portion (at least conductive agent patterned) as may be employed in various applications such as circuit boards or conductive traces. Examples of non-conductive fusing agents include fusing agents containing a non-conductive particulate such as a near-IR absorbing dye, a near-IR absorbing pigment, and combinations thereof.

As used herein, the term "3D printed polymer-particulate composite" or "extracted 3D printed polymer-particulate composite" each refer to the 3D printed polymer-particulate composite or the at least substantially pretreat agent free 3D printed polymer-particulate composite after having been subjected to a sintering temperature. As used herein, the terms "3D printed part," "3D printed polymer-particulate composite", "3D part," "part," "3D printed object," "3D object," or "object" may be a completed 3D printed part or a layer of a 3D printed part.

Referring now to FIG. 1, a simplified isometric view of an example of 3D printing system 100 is depicted. It is to be understood that the 3D printing system 100 may include additional components and that some of the components described herein may be removed and/or modified. Furthermore, components of the 3D printing system 100 depicted in FIG. 1 may not be drawn to scale and thus, the 3D printing system 100 may have a different size and/or configuration other than as shown therein.

Figure 2A:
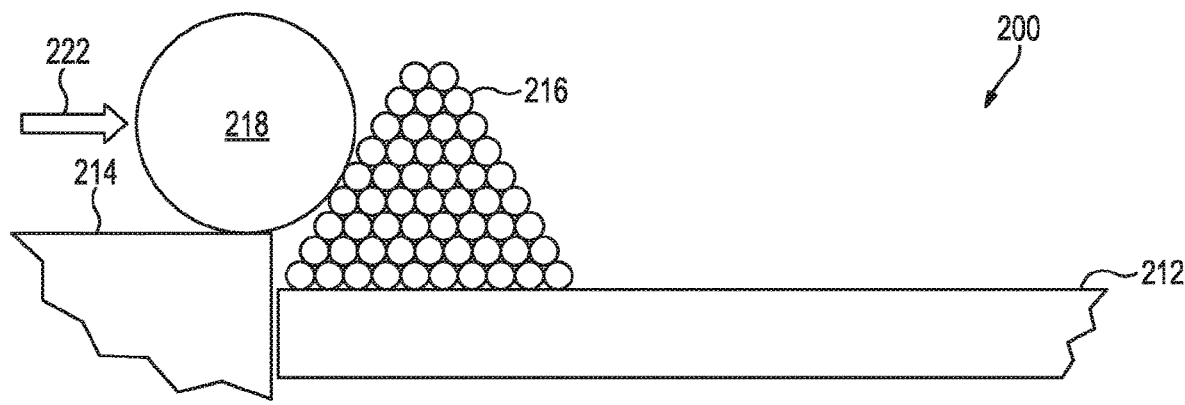
FIGS. 2A, 2B, 2C, 2D, 2E, and 2F are schematic views depicting the formation of a patterned 3D printed polymer-particulate composite, a 3D printed polymer-particulate composite, and an extracted 3D printed polymer-particulate composite using examples of a 3D printing method disclosed herein.
Figure 2B:
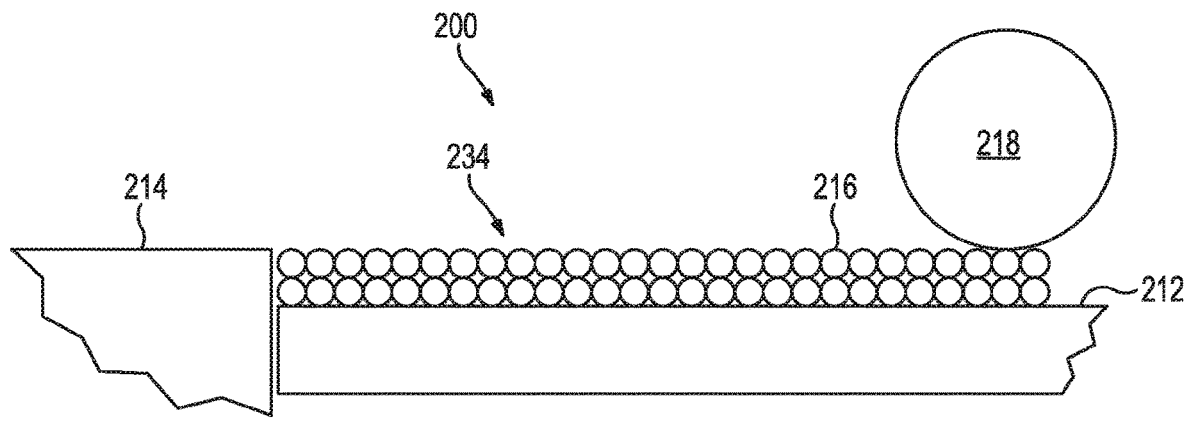
Figure 2C:
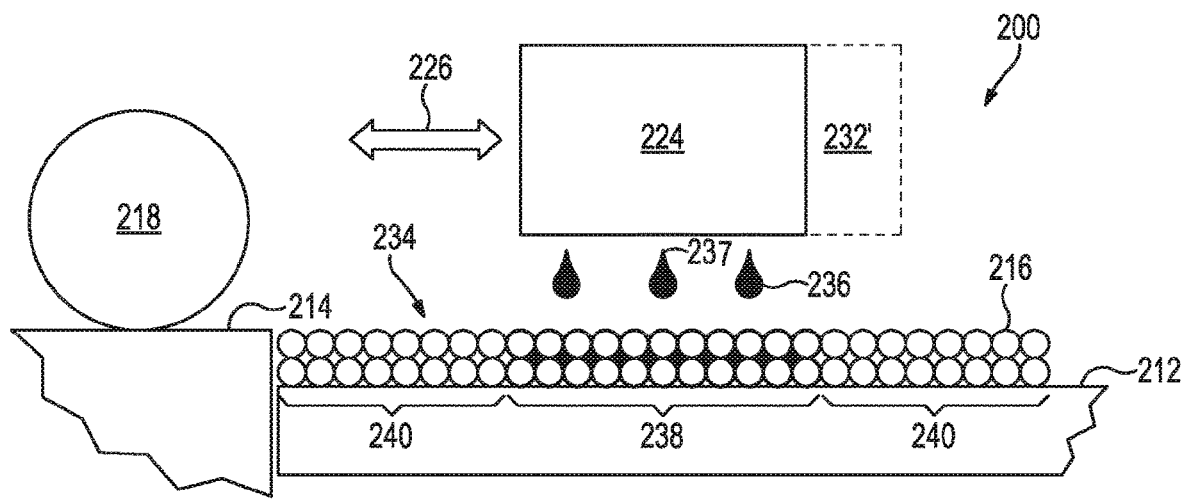
Figure 2D:
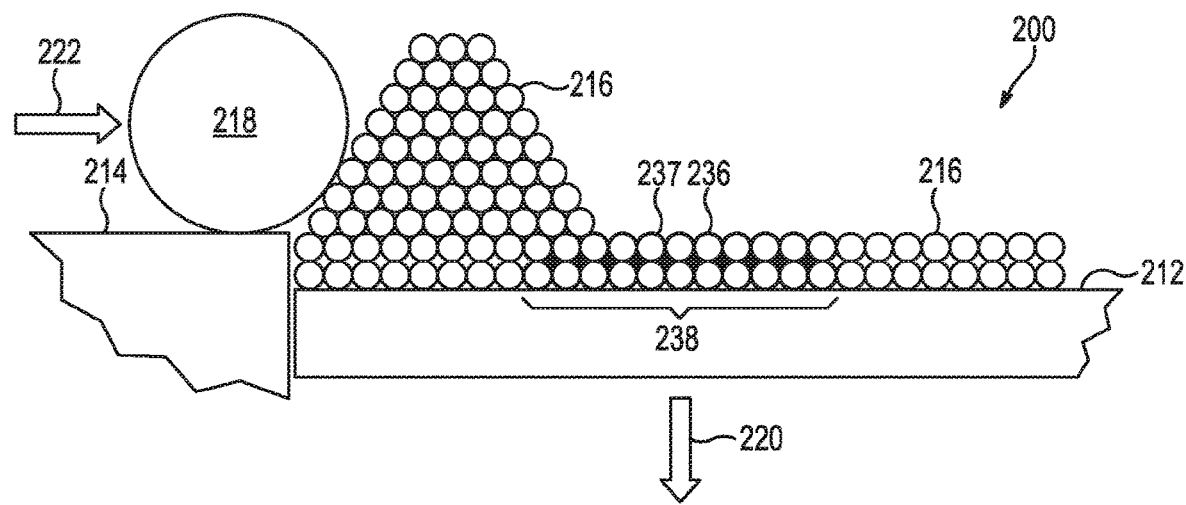
Figure 2E:
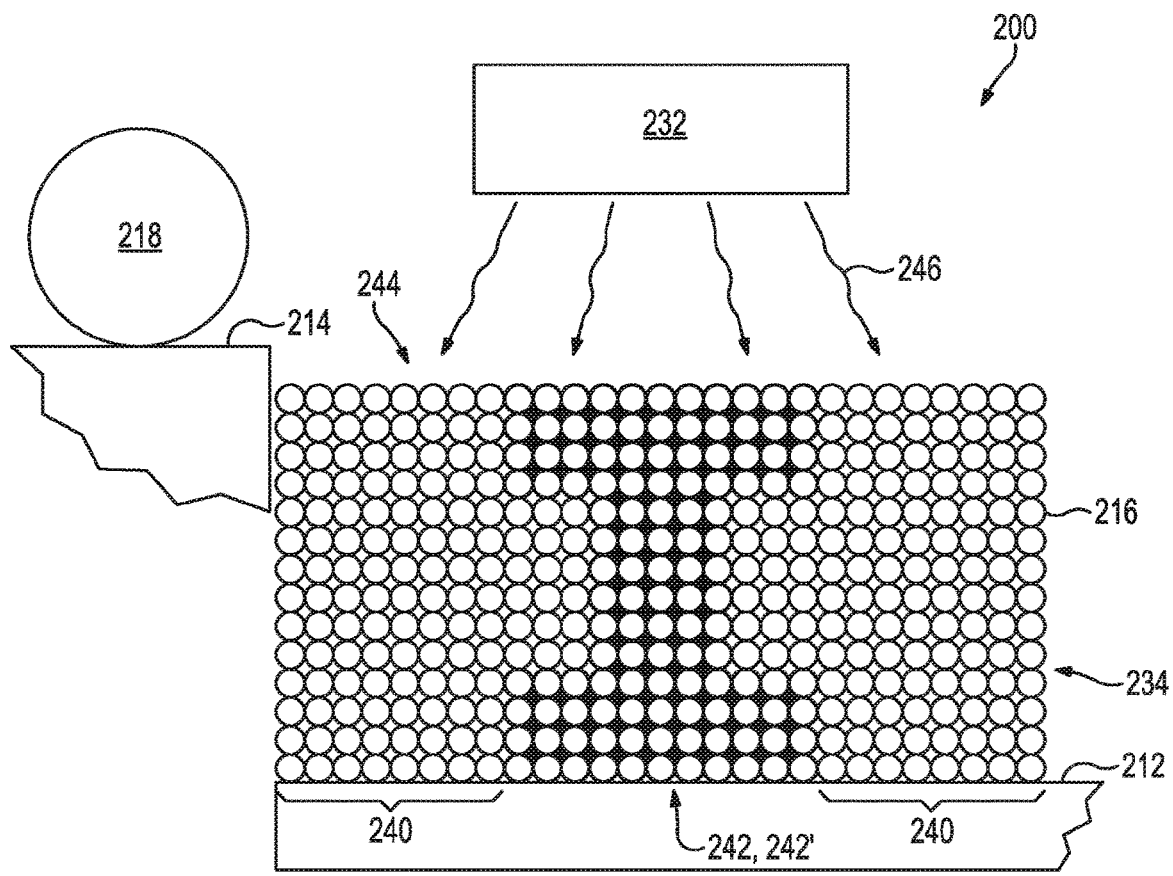

The 3D printing system 100 includes a supply 114 of polymer build material 116; a build material distributor 118; an inkjet applicator 124 for selectively dispensing a conductive agent 136 and/or a non-conductive fusing agent 137; at least one heat source 132, 132'; a controller 128; and a non-transitory computer readable medium (not illustrated for ease of illustration) having stored thereon computer executable instructions to cause the controller 128 to: utilize the build material distributor 118 and the inkjet applicator 124 to iteratively form multiple layers (e.g., layers 234 as depicted in FIG. 2B) of polymer build material 116 which are applied by the build material distributor 118 and have received the conductive agent 136 and/or the non-conductive fusing agent 137, as described herein, thereby creating a patterned 3D printed polymer-particulate composite (e.g., a patterned 3D printed polymer-particulate composite 242' as depicted in FIG. 2E). In some examples, the at least one heat source 132, 132' can heat (e.g., heat 246 as illustrated in FIG. 2E) the patterned 3D printed polymer-particulate composite to a sintering temperature, for instance, thereby substantially removing water and/or co-solvent and/or thermally binding of the polymer build material 116 (thermally bind the polymer build material and the at least one conductive particulate of the selectively applied conductive agent 136 and/or thermally bind the polymer build material and the at least one non-conductive particulate of the selectively applied non-conductive fusing agent 137) to create a 3D printed polymer-particulate composite.

As shown in FIG. 1, the printing system 100 includes a build area platform 112, the build material supply 114 containing polymer build material 116, and the build material distributor 118.

The build area platform 112 receives the polymer build material 116 from the build material supply 114. The build area platform 112 may be integrated with the printing system 100 or may be a component that is separately insertable into the printing system 100. For example, the build area platform 112 may be a module that is available separately from the printing system 100. The build area platform 112 that is shown is also one example, and could be replaced with another support member, such as a platen, a fabrication/print bed, a glass plate, or another build surface.

The build area platform 112 may be moved in a direction as denoted by the arrow 120, for instance, along the z-axis, so that polymer build material 116 may be delivered to the platform 112 or to a previously formed layer of polymer build material 116 (see arrow 220 as depicted in FIG. 2D). In an example, when the polymer build material 116 is to be delivered, the build area platform 112 may be programmed to advance (e.g., downward) enough so that the build material distributor 118 can push the polymer build material 116 onto the platform 112 to form a layer of the polymer build material 116 thereon (see, e.g., layer 234 as depicted in FIGS. 2A and 2B). The build area platform 112 may also be returned to its original position, for example, when a new part is to be built.

The build material supply 114 may be a container, bed, or other surface that is to position the polymer build material 116 between the build material distributor 118 and the build area platform 112. In some examples, the build material supply 114 may include a surface upon which the polymer build material 116 may be supplied, for instance, from a build material source (not shown) located above the build material supply 114. Examples of the build material source may include a hopper, an auger conveyer, or the like. In some examples, the build material supply 114 may include a mechanism (e.g., a delivery piston) to move the polymer build material 116 from a storage location to a position to be spread onto the build area platform 112 or onto a previously formed layer of polymer build material 116.

The build material distributor 118 may be moved in a direction as denoted by the arrow 122, for example, along the y-axis, over the build material supply 114 and across the build area platform 112 to spread a layer of the polymer build material 116 over the build area platform 112. The build material distributor 118 may also be returned to a position adjacent to the build material supply 114 following the spreading of the polymer build material 116. The build material distributor 118 may be a blade (e.g., a doctor blade), a roller, a combination of a roller and a blade, and/or any other device capable of spreading the polymer build material 116 over the build area platform 112. For instance, the build material distributor 118 may be a counter-rotating roller.

The polymer build material 116 may be any particulate polymer material. In an example, the polymer build material 116 may be a powder. In some examples, discrete polymer build material 116 powder particles should no longer be visible in the 3D printed polymer-particulate composite. In some examples, the powder may be formed from, or may include, short fibers that may, for example, have been cut into short lengths from long strands or threads of material.

Individual elements or alloys may be used as the at least one conductive particulate (i.e., an electrically conductive particulate). For example, the at least one conductive particulate can be formed of bronzes, brasses, aluminum and alloys thereof, nickel and alloys thereof, iron and alloys thereof, gold and alloys thereof, silver and alloys thereof, platinum and alloys thereof, and copper and alloys thereof, among other possibilities. In some examples, the at least one conductive particulate can be composed of brass, zinc, aluminum, nickel, cobalt, iron, gold, silver, platinum, copper, chromium, manganese, molybdenum, tin, carbon black, graphene, graphite, conductive carbonaceous materials, a conductive polymer, and combinations thereof. As used herein a conductive polymer refers to a polymer having an electrical conductivity in a range of from $1 \times 10^1$ to $4.6 \times 10^5$ siemens/meter. In some examples, the at least one conductive particulate can have an electrical conductivity of greater than $1 \times 10^1$ siemens/meter, or of greater than $1 \times 10^2$ siemens/meter, or of greater than $1 \times 10^3$ siemens/meter, or of greater than $1 \times 10^4$ siemens/meter, or of greater than $1 \times 10^4$ siemens/meter, or greater than $1 \times 10^5$ siemens/meter, among other possibilities.

During sintering the conductive particulates (e.g., silver) of the conductive agent 136 are thermally bound to form a 3D printed polymer-particulate composite having a conductive continuous body. That is, without wish to be bound to theory, it is believed thorough removal of water/co-solvent and/or thermally binding polymer build material 116 and at least one conductive particulate of the conductive agent a conductive continuous body is formed.

As used herein, thermally binding refers to atomic rearrangement (atoms of the polymer build material, atoms of a non-conductive particulate of a non-conductive fusing agent, and/or atoms of a conductive particulate of the conductive agent) that occurs at a temperature below a melt temperature of the polymer build material and/or molecular rearrangement. Examples of thermally binding include sintering and fusing.

As used herein, sintering or sintered refers to atomic rearrangement of conductive particulates. As detailed herein, conductive particulates can be sintered when exposed to a sintering temperature.

As used herein, fusing or fused refers to molecular rearrangement such as chain entanglement of non-conductive particulates such as particulates included in build material 116. As detailed herein, the build material 116 of the polymer-conductive agent composite portion can be substantially fused, substantially unfused, or substantially partially fused depending at least in part on an amount of selectively applied conductive agent 136.

In examples employing the non-conductive fusing agent 137, thermally binds the non-conductive fusing agent 137 particulates causes the fusing agent particles to merge together and form a non-conductive continuous body. That is, in some examples, a continuous body can include distinct portion such as polymer-conductive agent composite portion s and/or polymer-fusing agent composite portions. By "continuous body," it is meant that the polymer build material particles are merged together with the conductive particulate from the conductive agent to form a part with sufficient conductivity/resistivity and mechanical strength to meet target properties of the final 3D printed polymer-particulate composite. Notably, sintering may cause a generally non-conductive patterned 3D printed polymer-particulate composite to selectively form at least a portion thereof into a conductive continuous body. That is, it is understood that some (portions sintered) but not all of the patterned 3D printed polymer-particulate composite may be formed into a conductive continuous body by thermally binding the conductive particulates in the conductive agent at a sintering temperature that is below a 'full' melt temperature of the polymer build material but that allows partial melting and/or densification of the polymer build material and/or the non-conductive particulates. Similarly, some portions of the patterned 3D printed polymer-particulate composite may be formed into a dense non-conductive continuous body by thermally binding the residual non-conductive particulates from the non-conductive fusing agent at a temperature that is below the 'full' melt temperature of the polymer build material but allows partial melting and/or densification of the polymer build material and/or the non-conductive particulates. While various example sintering temperatures/ranges are described herein, it is to be understood that this temperature may vary, depending, in part, upon the composition and phase(s) of the polymer build material 116 and/or the conductive agent 136.

In some examples, the polymer build material 116 can comprise at least one polymer, which can be a powder, a liquid, a paste, or a gel. Examples of polymer(s) can include semi-crystalline thermoplastic materials with a wide processing window of greater than 5° C. (e.g., the temperature range between the melting point and the re-crystallization temperature). Some specific examples of the polymer(s) can include polyamides (PAs) (e.g., PA 11/nylon 11, PA 12/nylon 12, PA 6/nylon 6, PA 8/nylon 8, PA 9/nylon 9, PA 6,6/nylon 6,6, PA 612/nylon 6,12, PA 8,12/nylon 8,12, PA 9,12/nylon 9,12, or combinations thereof). Other specific examples of the polymer(s) can include polyethylene, polyethylene terephthalate (PET), and an amorphous variation of these materials. Still other examples of build materials can include polystyrene, polyacetals, polypropylene, polycarbonate, polyester, thermal polyurethanes, other engineering plastics, and blends of any two or more of the polymers listed herein. Core shell polymer particles of these materials may also be used.

The polymer(s) can have a melting point ranging from about 50° C. to about 400° C. As examples, the polymer(s) may be a polyamide having a melting point of 180° C., or thermal polyurethanes having a melting point ranging from about 100° C. to about 185° C., among other possibilities. In some examples, the polymer build material can have a glass transition temperature of from about 25° C. to about 125° C. and can have a thermal decomposition temperature of from about 250° C. to about 600° C. As used herein the term "glass transition temperature" refers to a range of temperatures over which glass transition occurs. As used herein the term "thermal decomposition temperature" refers to a temperature at which the substance chemically decomposes. The glass transition temperature is lower than the thermal decomposition temperature.

The polymer(s) can be made up of similarly sized particles or differently sized particles. In some examples, the polymer(s) can include particles of two different sizes. The term "size," as used herein with regard to the build material, refers to the diameter of a spherical particle, or the average diameter of a non-spherical particle (e.g., the average of multiple diameters across the particle). In an example, the average size of the polymer(s) particles can range from about 0.1 μm to about 100 μm, or from about 1 μm to about 80 μm, or from about 5 μm to about 50 μm. As another example, the average particle size of the particles of the polymer build material 116 may range from about 1 μm to about 200 μm.

In various examples, any polymer build material 116 may be used that is in powder form at the outset of the 3D printing method(s) disclosed herein. As such, the melting point, solidus temperature, eutectic temperature, and/or peritectic temperature of the polymer build material 116 may be above the temperature of the environment in which the patterning portion of the 3D printing method is performed (e.g., above 80° C. and/or above 140° C.).

In various examples, a composition for 3D printing can include the polymer build material 116, the non-conductive fusing agent 137, and the conductive agent 136. For instance, the conductive agent 136 can include:

at least one conductive particulate present in an amount of from about 10% to about 60% of a total weight of the conductive agent;

at least one co-solvent present in an amount of from about 10% to about 50% of a total weight of the conductive agent; and an additive present in an amount of from about 0% to about 10% of a total weight of the conductive agent.

In various examples, the conductive agent 136 can include:

at least one conductive particulate present in an amount of from about 10% to about 60% of a total weight of the conductive agent;

at least one co-solvent present in an amount of from about 10% to about 50% of a total weight of the conductive agent;

water present in an amount of from about 0% to about 50% of a total weight of the conductive agent; and an additive present in an amount of from about 0% to about 10% of a total weight of the conductive agent, wherein a sum % of the at least one conductive particulate %, the co-solvent %, the water %, and the additive % equal 100% of the total weight of the conductive agent.

As mentioned, the at least one conductive particulate can be present in an amount of from about 10% to about 60% of a total weight of the conductive agent, among other possibilities. For instance, in some examples, the at least one conductive particulate is present in the conductive agent in an amount of from about 10 wt % to about 60 wt % based on the total weight of the conductive agent, or from about 15 wt % to about 60 wt % based on the total weight of the conductive agent, or from about 20 wt % to about 60 wt % based on the total weight of the conductive agent, or from about 25 wt % to about 60 wt % based on the total weight of the conductive agent, or from about 30 wt % to about 60 wt % based on the total weight of the conductive agent, or from about 35 wt % to about 60 wt % based on the total weight of the conductive agent, or from about 40 wt % to about 60 wt % based on the total weight of the conductive agent, or from about 35 wt % to about 45 wt % based on the total weight of the conductive agent, or from about 10 wt % to about 45 wt % based on the total weight of the conductive agent, or less than about 60 wt % based on the total is weight of the conductive agent, or less than about 50 wt % based on the total weight of the conductive agent, or less than about 45 wt % based on the total weight of the conductive agent, or less than about 40 wt % based on the total weight of the conductive agent, or less than about 35 wt % based on the total weight of the conductive agent, or less than about 30 wt % based on the total weight of the conductive agent, or less than about 25 wt % based on the total weight of the conductive agent, or less than about 20 wt % based on the total weight of the conductive agent, or less than about 15 wt % based on the total weight of the conductive agent, or less than about 10 wt % based on the total weight of the conductive agent, or greater than about 10 wt % based on the total weight of the conductive agent, or greater than about 20 wt % based on the total weight of the conductive agent or greater than about 30 wt % based on the total weight of the conductive agent or greater than about 40 wt % based on the total weight of the conductive agent, or greater than about 50 wt % based on the total weight of the conductive agent.

The at least one conductive particulate can comprise metal particles having a Z-average particle size of from about 20 nanometers to about 70 nanometers as determined by Malvern dynamic light scattering, among other possibilities. For instance, the at least one conductive particulate can comprise metal particles having a Z-average particle size of from about 20 nanometers to about 60 nanometers. As another example, the at least one conductive particulate can comprise metal particles having a Z-average particle size of from about 30 nanometers to about 50 nanometers.

In some examples, the at least one conductive particulate can include a single phase metallic alloys. For single phase metallic alloys melting begins just above the solidus temperature (where melting is initiated) and is not complete until the liquidus temperature (temperature at which all the solid has melted) is exceeded. For other single phase metallic alloys, melting begins just above the peritectic temperature. The peritectic temperature is defined by the point where a single phase solid transforms into a two phase solid plus liquid mixture, where the solid above the peritectic temperature is of a different phase than the solid below the peritectic temperature. When the at least one conductive particulate is composed of two or more phases (e.g., a multiphase alloy made of two or more elements), melting can begin when the eutectic or peritectic temperature is exceeded. The eutectic temperature is defined by the temperature at which a single phase liquid completely solidifies into a two phase solid. Melting of the single phase metallic alloy or the multiple phase metallic alloy begins just above the solidus, eutectic, or peritectic temperature and is not complete until the liquidus temperature is exceeded. In some examples, sintering can occur below the solidus temperature, the peritectic temperature, or the eutectic temperature. In some examples, sintering occurs above the solidus temperature, the peritectic temperature, or the eutectic temperature. Sintering above the solidus temperature is known as super solidus sintering, and this technique may be useful when utilizing larger build material particles and/or to achieve high density. It is to be understood that the sintering temperature may be high enough to offer sufficient energy to allow atom mobility between adjacent particles.

As mentioned, individual elements or alloys may be used as the at least one conductive particulate (i.e., an electrically conductive particulate). For example, the at least one conductive particulate can be formed of bronzes, brasses, aluminum and alloys thereof, nickel and alloys thereof, iron and alloys thereof, gold and alloys thereof, silver and alloys thereof, platinum and alloys thereof, and copper and alloys thereof, among other possibilities. In some examples, the at least one conductive particulate can be composed of brass, zinc, aluminum, nickel, cobalt, iron, gold, silver, platinum, copper, chromium, manganese, molybdenum, tin, carbon black, graphene, graphite, conductive carbonaceous materials, a conductive polymer, and combinations thereof. A used herein a conductive polymer refers to a polymer having an electrical conductivity in a range of from $1 \times 10^1$ to $4.6 \times 10^5$ siemens/meter. In some examples, the at least one conductive particulate can have an electrical conductivity of greater than $1 \times 10^1$ siemens/meter, or of greater than $1 \times 10^2$ siemens/meter, or of greater than $1 \times 10^3$ siemens/meter, or of greater than $1 \times 10^4$ siemens/meter, or of greater than $1 \times 10^4$ siemens/meter, or greater than $1 \times 10^5$ siemens/meter, among other possibilities.

In some examples, a conductive precursor (e.g., copper oxide) can be chemically, photochemically, and/or electrochemically, or otherwise formed into a conductive particulate. For instance, a conductive precursor can be reduced/decomposed to a corresponding conductive particulate metal prior to heating to a sintering temperature and/or during sintering.

As shown in FIG. 1, the printing system 100 includes an applicator 124, which may contain the conductive agent 136 disclosed herein. The conductive agent 136 includes at least a co-solvent and the at least one conductive particulate. In some instances, the conductive agent 136 comprises the co-solvent and the at least one conductive particulate, without any other components. In the examples disclosed herein, the at least one conductive particulate may be dispersed in the co-solvent.

Classes of co-solvents that may be used in the water-based conductive agent 136 include aliphatic alcohols, aromatic alcohols, dials, glycol ethers, polyglycolic ethers, 2-pyrrolidones, caprolactams, formamides, acetamides, glycols, and long chain alcohols. Examples of these co-solvents include aliphatic alcohols, 1,2-alcohols, 1,3-alcohols, 1,5-alcohols, ethylene glycol alkyl ethers, propylene glycol alkyl ethers, higher homologs (C6-C12) of polyethylene glycol alkyl ethers, N-alkyl caprolactams, unsubstituted caprolactams, both substituted and unsubstituted formamides, both substituted and unsubstituted acetamides, and the like. For instance, in some examples, the co-solvent can be 2-pyrrolidinone, hydroxyethyl-2-pyrrolidone, diethylene glycol, 2-(2-Butoxyethoxy)ethan-1-ol, 2-methyl-1,3-propanediol, tetraethylene glycol, tripropylene glycol methyl ether, dipropylene glycol methyl ether, tripropylene glycol butyl ether, dipropylene glycol butyl ether, triethylene glycol butyl ether, 1,2-hexanediol, 2-hydroxyethyl pyrrolidinone, 2-hydroxyethyl-2-pyrrolidinone, 1,6-hexanediol, and combinations thereof.

Examples of some co-solvents include water-soluble high-boiling point solvents (i.e., humectants), which have a boiling point of at least 120° C., or higher. Some examples of high-boiling point solvents include 2-pyrrolidone (boiling point of about 245° C.), 2-methyl-1,3-propanediol (boiling point of about 212° C.), and combinations thereof.

The co-solvent(s) may be present in the conductive agent 136 in a total amount ranging from about 1 wt % to about 50 wt % based upon the total weight of the conductive agent 136, depending upon the application architecture of the applicator 124. In various examples, the co-solvent can be present in an amount of from about 10% to about 50% of a total weight of the conductive agent; or present in an amount of from about 20% to about 50% of a total weight of the conductive agent, or present in an amount of from about 30% to about 50% of a total weight of the conductive agent, or present in an amount of from about 40% to about 50% of a total weight of the conductive agent, or present in an amount of from about 10% to about 40% of a total weight of the conductive agent, or present in an amount of from about 10% to about 100% of a total weight of the conductive agent, or present in an amount of from about 10% to about 20% of a total weight of the conductive agent, or present in an amount of from about 10% to about 50% of a total weight of the conductive agent, or present in an amount of from about 20% to about 40% of a total weight of the conductive agent.

In some examples, the conductive agent 136 may include other additives, depending, in part, upon the applicator 124 that is to be used to dispense the conductive agent 136. In some examples, the non-conductive fusing agent 137 may include other additives, depending, in part, upon the applicator 124 that is to be used to dispense the non-conductive fusing agent 137. Examples of other conductive agent additives include co-solvent(s), surfactant(s), antimicrobial agent(s), anti-kogation agent(s), viscosity modifier(s), pH adjuster(s) and/or sequestering agent(s). The presence of a co-solvent and/or a surfactant in the conductive agent 136 may assist in obtaining a particular wetting behavior with the polymer build material 116.

That is, surfactant(s) may be used to enhance the wetting properties and the flow properties of the conductive agent 136. In some examples, the surfactant can be Dowfax™ 2A1. Examples of surfactants include a self-emulsifiable, nonionic wetting agent based on acetylenic diol chemistry (e.g., SURFYNOL® SEF from Air Products and Chemicals, Inc), a nonionic fluorosurfactant (e.g., CAPSTONE® fluorosurfactants from DuPont, previously known as ZONYL FSO), and combinations thereof. In some examples, the surfactant is an ethoxylated low-foam wetting agent (e.g., SURFYNOL® 440 or SURFYNOL® CT-111 from Air Products and Chemical Inc.) or an ethoxylated wetting agent and molecular defoamer (e.g., SURFYNOL® 420 from Air Products and Chemical Inc.). Still other surfactants include non-ionic wetting agents and molecular defoamers (e.g., SURFYNOL® 104E from Air Products and Chemical Inc.) or water-soluble, non-ionic surfactants (e.g., TERGITOLT™ TMN-6 or TERGITOL™ 15-S-7 from The Dow Chemical Company). In some examples, it may be useful to utilize a surfactant having a hydrophilic-lipophilic balance (HLB) less than 10.

Whether an individual surfactant is used or a combination of surfactants is used, the total amount of surfactant(s) in the conductive agent 136 may range from about 0.01 wt % to about 10 wt % based on the total weight of the conductive agent 136. In another example, the total amount of surfactant(s) in the conductive agent 136 may range from about 0.5 wt % to about 2.5 wt % based on the total weight of the conductive agent 136.

The liquid vehicle may also include antimicrobial agent(s). Antimicrobial agents include biocides and fungicides. Example antimicrobial agents may include the NUOSEPTT™ (Troy Corp.), UCARCIDET™ (Dow Chemical Co.), ACTICIDE® M20 (Thor), and combinations thereof. Examples of biocides include an aqueous solution of 1,2-benzisothiazolin-3-one (e.g., PROXEL® GXL from Arch Chemicals, Inc.), quaternary ammonium compounds (e.g., Bardac® 2250 and 2280, Barquat® 50-65B, and Carboquat® 250-T, all from Lonza Ltd. Corp), and an aqueous solution of methylisothiazolone (e.g., Kordek® MLX from Dow Chemical Co.). The biocide or antimicrobial may be added in any amount ranging from about 0.05 wt % to about 0.5 wt % (as indicated by regulatory usage levels) with respect to the total weight of the conductive agent 136.

An anti-kogation agent may be included in the conductive agent 136. Kogation refers to a loss in jetting performance through the deposit of dried agent (e.g., conductive agent 136) on a heating element of a thermal inkjet printhead. Anti-kogation agent(s) is/are included to assist in preventing the buildup of kogation. Examples of anti-kogation agents include oleth-3-phosphate (e.g., commercially available as CRODAFOS™ O3A or CRODAFOS™ N-3 acid from Croda), or a combination of oleth-3-phosphate and a low molecular weight (e.g., <5,000) polyacrylic acid polymer (e.g., commercially available as CARBOSPERSE™ K-7028 Polyacrylate from Lubrizol). Whether an individual anti-kogation agent is used or a combination of anti-kogation agents is used, the total amount of anti-kogation agent(s) in the conductive agent 136 may range from greater than 0.20 wt % to about 0.62 wt % based on the total weight of the conductive agent 136.

Sequestering agents, such as EDTA (ethylene diamine tetra acetic acid), may be included to eliminate the deleterious effects of heavy metal impurities, and buffer solutions may be used to control the pH of the conductive agent 136. From 0.01 wt % to 2 wt % of each of these components, for example, can be used. Viscosity modifiers and buffers may also be present, as well as other known additives to modify properties of the conductive agent 136. Such additives can be present in amounts ranging from about 0.01 wt % to about 20 wt %.

The applicator 124 may be scanned across the build area platform 112 in the direction indicated by the arrow 126, for instance, along the y-axis. The applicator 124 may be, for instance, an inkjet applicator, such as a thermal inkjet printhead, a piezoelectric printhead, or a continuous inkjet printhead, and may extend a width of the build area platform 112. While the applicator 124 is shown in FIG. 1 as an individual applicator, it is to be understood that the applicator 124 may include multiple applicators that span the width of the build area platform 112. Additionally, the applicators 124 may be positioned in multiple printbars. The applicator 124 may also be scanned along the x-axis, for instance, in configurations in which the applicator 124 does not span the width of the build area platform 112 to enable the applicator 124 to deposit the conductive material 136 over a large area of a layer of the polymer build material 116. The applicator 124 may thus be attached to a moving XY stage or a translational carriage (neither of which is shown) that moves the applicator 124 adjacent to the build area platform 112 in order to deposit the conductive agent 136 in predetermined areas of a layer of the polymer build material 116 that has been formed on the build area platform 112 in accordance with the method(s) disclosed herein. The applicator 124 may include a plurality of nozzles (not shown) through which the conductive agent 136 is to be ejected.

The applicator 124 may deliver drops of the conductive agent 136 at a resolution ranging from about 300 dots per inch (DPI) to about 1200 DPI. In some examples, the applicator 124 may deliver drops of the conductive agent 136 at a higher or lower resolution. The drop velocity may range from about 2 m/s to about 24 m/s and the firing frequency may range from about 1 kHz to about 100 kHz. In one example, each drop may be in the order of about 10 picoliters per drop, although it is contemplated that a higher or lower drop size may be used. For example, the drop size may range from about 1 picoliter to about 400 picoliter. In some examples, applicator 124 is able to deliver variable size drops of the conductive agent 136.

Each of the described physical elements may be operatively connected to a controller 128 of the printing system 100. The controller 128 may control the operations of the build area platform 112, the build material supply 114, the build material distributor 118, and the applicator 124. As an example, the controller 128 may control actuators (not shown) to control various operations of the 3D printing system 100 components. The controller 128 may be a computing device, a semiconductor-based microprocessor, a central processing unit (CPU), an application specific integrated circuit (ASIC), and/or another hardware device. Although not shown, the controller 128 may be connected to the 3D printing system 100 components via communication lines.

The controller 128 may manipulate and transform data, which may be represented as physical (electronic) quantities within the printing system's registers and memories, to control the physical elements to create the extracted 3D printed polymer-particulate composite 250. As such, the controller 128 is depicted as being in communication with a data store 130. The data store 130 may include data pertaining to a 3D printed polymer-particulate composite to be printed by the 3D printing system 100, The data for the selective delivery of the polymer build material 116 and the conductive agent 136 may be derived from a model of the 3D printed polymer-particulate composite to be formed. For instance, the data may include the locations on each layer of polymer build material 116 that the applicator 124 is to deposit the conductive agent 136. In one example, the controller 128 may use the data to control the applicator 124 to selectively apply the conductive agent 136. The data store 130 may also include machine readable instructions (stored on a non-transitory computer readable medium) that are to cause the controller 128 to control the amount of polymer build material 116 that is supplied by the build material supply 114, the movement of the build area platform 112, the movement of the build material distributor 118, or the movement of the applicator 124.

As depicted in FIG. 1, the printing system 100 may include a heater 132, 132'. In some examples, the heater 132 includes a furnace or oven, a microwave, or devices capable of hybrid heating (i.e., convective/conductive heating and/or microwave heating). The heater 132 may be used for the patterned 3D printed polymer-particulate composite layer-by-layer, as described herein.

In some example, the patterned 3D printed metal object 142' can be exposed to heat such as heat provided by heater 132. In some examples, the heater 132 may be a conductive heater or a radiative heater (e.g., infrared lamps, ultraviolet, or near-IR lamps, light emitting diodes (LED) or LED arrays, flash lamps or visible light sources)) that is integrated into the system 100. These other types of heaters 132 may be placed below the build area platform 112 (e.g., conductive heating from below the platform 112) or may be placed above the build area platform 112 (e.g., radiative heating of the build material layer surface). Combinations of these types of heating may also be used. These other types of heaters 132 may be used throughout the 3D printing process. In still some examples, the heater 132' may be a radiative heat source (e.g., a curing lamp) that is positioned to heat each layer (e.g., layer 234 as depicted in FIG. 2C) after the conductive agent 136 has been applied thereto. As depicted in FIG. 1, the heater 132' can be attached to the side of the is applicator 124, which allows for printing and heating in an individual pass. In some examples, both the heater 132 and the heater 132' may be used.

Referring now to FIGS. 2A through 2F, an example of the 3D printing method is depicted. Prior to execution of printing, the controller may access data stored in the data store pertaining to a 3D printed polymer-particulate composite 242 that is to be printed. The controller may determine the number of layers of polymer build material 216 that are to be formed, and the locations at which conductive agent 236 and/or the non-conductive fusing agent 237 from the applicator 224 is to be deposited on each of the respective layers.

In FIG. 2A, the build material supply 214 may supply the polymer build material particles 216 into a position so that they are ready to be spread onto the build area platform 212. In FIG. 2B, the build material distributor 218 may spread the supplied polymer build material 216 onto the build area platform 212. The controller may execute control build material supply instructions to control the build material supply 214 to appropriately position the polymer build material 216, and may execute control spreader instructions to control the build material distributor 218 to spread the supplied polymer build material 216 over the build area platform 212 to form a layer 234 of polymer build material 216 thereon. As shown in FIG. 2B, one layer 234 of the polymer build material 216 has been applied.

The layer 234 has a substantially uniform thickness across the build area platform 212. In an example, the thickness of the layer 234 ranges from about 30 μm to about 300 μm, although thinner or thicker layers may also be used. For example, the thickness of the layer 234 may range from about 20 μm to about 500 μm. The layer thickness may be about 2× the particle diameter (as shown in FIG. 2B) at a minimum for finer part definition. In some examples, the layer thickness may be about 1.2× (i.e., 1.2 times) the particle diameter.

Referring now to FIG. 2C, selectively applying the conductive agent 236 and/or the non-conductive fusing agent 237 on a portion 238 of the polymer build material 216 continues. As illustrated in FIG. 2C, the conductive agent 236 and/or the non-conductive fusing agent 237 may be dispensed from the applicator 224, among other possibilities such as dispensing the conductive agent 236 and the non-conductive fusing agent 237 from separate respective applicators. The applicator 224 may be a thermal inkjet printhead, a piezoelectric printhead, or a continuous inkjet printhead, and the selectively applying of the conductive agent 236 and/or the non-conductive fusing agent 237 may be accomplished by the associated inkjet printing technique. As such, the selectively applying of the conductive agent 236 and/or the non-conductive fusing agent 237 may be accomplished by thermal inkjet printing or piezo electric inkjet printing.

The controller (e.g., controller 128 as illustrated in FIG. 1) may execute instructions to control the applicator 224 (e.g., in the directions indicated by the arrow 226) to deposit the conductive agent 236 and/or the non-conductive fusing agent 237 onto predetermined portion(s) 238 of the polymer build material 216 that are to become part of a patterned 3D printed polymer-particulate composite 242' and are to ultimately be sintered to form the extracted 3D printed polymer-particulate composite 250, as described herein. That is, it is understood that the extracted 3D printed polymer-particulate composite 250 can include a polymer-fusing agent composite portion (non-conductive fusing agent without the conductive agent present) and a polymer-conductive agent composite portion (at least conductive agent patterned) as may be employed for various applications including circuit boards, among other possibilities.

The applicator 224 may be programmed to receive commands from the controller and to deposit the conductive agent 236 and/or the non-conductive fusing agent 237 according to a pattern of a cross-section for the layer of the 3D printed polymer-particulate composite 242 that is to be formed. As used herein, the cross-section of the layer of the 3D printed polymer-particulate composite 242 to be formed refers to the cross-section that is parallel to the surface of the build area platform 212. In the example shown in FIG. 2C, the applicator 224 selectively applies the conductive agent 236 and/or the non-conductive fusing agent 237 on those portion(s) 238 of the layer 234 that are to be fused to become the first layer of the 3D printed polymer-particulate composite 242. As an example, if the 3D part that is to be formed is to be shaped like a cube or cylinder, the conductive agent 236 and/or the non-conductive fusing agent 237 will be deposited in a square pattern or a circular pattern (from a top view), respectively, on at least a portion of the layer 234 of the polymer build material 216. In the example shown in FIG. 2C, the conductive agent 236 and/or the non-conductive fusing agent 237 is deposited in a square pattern on the portion 238 of the layer 234 and not on the portions 240.

As mentioned above, the conductive agent 236 includes the at least one conductive particulate and the co-solvent. As also mentioned above, in some examples the conductive agent 236 also includes the coalescing solvent (as or in addition to the liquid vehicle). In such examples, the coalescing solvent plasticizes the polymer particles and enhances the coalescing of the polymer particles upon exposure to photonic energy in order to temporarily bind the polymer build material particles 216 together to form the patterned 3D printed polymer-particulate composite 242'. In various examples, the coalescing solvent (e.g., water) makes up the balance of the conductive agent 236.

In some examples, the coalescing solvent may be a lactone, such as 2-pyrrolidinone or 1-(2-hydroxyethyl)-2-pyrrolidone. In some examples, the coalescing solvent may be a glycol ether or a glycol ether esters, such as tripropylene glycol mono methyl ether, dipropylene glycol mono methyl ether, dipropylene glycol mono propyl ether, tripropylene glycol mono n-butyl ether, propylene glycol phenyl ether, dipropylene glycol methyl ether acetate, diethylene glycol mono butyl ether, diethylene glycol mono hexyl ether, ethylene glycol phenyl ether, diethylene glycol mono n-butyl ether acetate, or ethylene glycol mono n-butyl ether acetate. In some examples, the coalescing solvent may be a water-soluble polyhydric alcohol, such as 2-methyl-1,3-propanediol. In some examples, the coalescing solvent may be a combination of any of the examples above. In some examples, the coalescing solvent is selected from the group including 2-pyrrolidinone, 1-(2-hydroxyethyl)-2-pyrrolidone, tripropylene glycol mono methyl ether, dipropylene glycol mono methyl ether, dipropylene glycol mono propyl ether, tripropylene glycol mono n-butyl ether, propylene glycol phenyl ether, dipropylene glycol methyl ether acetate, diethylene glycol mono butyl ether, diethylene glycol mono hexyl ether, ethylene glycol phenyl ether, diethylene glycol mono n-butyl ether acetate, ethylene glycol mono n-butyl ether acetate, 2-methyl-1,3-propanediol, and a combination thereof.

The coalescing solvent may be present in the conductive agent 236 in an amount ranging from about 0.1 wt % to about 50 wt %, or from about 1.0 wt % to about 40 wt %, or from about 10 wt % to about 30 wt % (based upon the total weight of the conductive agent 236), In some examples, greater or lesser amounts of the coalescing solvent may be used depending, in part, upon the application architecture of the applicator 224.

When the conductive agent 236 is selectively applied in the targeted portion(s) 238, the at least one particle (present in the conductive agent 236) may infiltrate the interstitial spaces among the polymer build material 216. The volume of the conductive agent 236 that is applied per unit of polymer build material 216 in the patterned portion 238 may be sufficient to fill a major fraction, or most of the porosity existing within the thickness of the portion 238 of the layer 234, among other possibilities.

In some examples, the conductive agent 236 can selectively applied in an amount of from about 10 to about 95 weight percent of a total weight of a polymer-conductive agent composite portion. As used herein, a polymer-conductive agent composite portion refers to a portion of a 3D printed object that includes polymer build material and a conductive agent. In some examples, an amount of the conductive agent 236 selectively applied to polymer build material 216 can be varied, for instance, to alter a degree of fusing of the polymer build material 216 (relative to polymer build material exposed to same/similar conditions but having a different amount of conductive agent). In some examples, selectively applying the conductive agent can include applying the conductive agent in an amount of from: about 10 to about 20 weight percent of a total weight percent of the polymer-conductive agent composite portion to cause the polymer build material of the polymer-conductive agent composite portion to substantially fuse responsive to heating to the sintering temperature; about 21 to about 25 weight percent of a total weight percent of the polymer-conductive agent composite portion to cause the polymer build material of the polymer-conductive agent composite portion to substantially partially fuse responsive to heating to the sintering temperature; or about 26 to about 60 weight percent of a total weight percent of the polymer-conductive agent composite portion to cause the polymer build material of the polymer-conductive agent composite portion to remain substantially unfused responsive to heating to the sintering temperature. While specific amounts of conductive agent are provided above, it is understood that with different materials such as different types of polymer build materials an amount of the conductive agent can be varied to produce a desired degree of fusing of the polymer build material. That is, the build material of the polymer-conductive agent composite portion can be comprised of substantially fused polymer build material, substantially unfused polymer build material, or substantially partially fused polymer build material. As used herein, substantially fused refers to about 90% or more of the build material 216 fusing. As used herein, partially fused refers to about 21% to about 79% of the build material 216 fusing. As used herein, remain substantially unfused refers to about 0% to about 20% of the build material remaining unfused. That is, the conductive agent and the build material can be heated to a sintering temperature to form a polymer-conductive agent composition portion of a printed polymer-particulate composite.

For instance, in various examples, a composition can include: a polymer build material; and a conductive agent including at least one conductive particulate dispensable onto the polymer build material to form a polymer-conductive agent composite portion of a printed polymer-particulate composite when heated to a sintering temperature, the at least one conductive particulate present in an amount of from about 10 to about 60 weight percent of a total weight of the polymer-conductive agent composite portion, where the polymer build material is present in an amount of from about 5 to about 90 weight percent of the total weight of the polymer-conductive agent composite portion, among other possibilities.

For instance, in some examples, the polymer build material can be present in an amount of from about 30 to about 90 weight percent of the total weight of the polymer-conductive agent composite portion, among other possibilities. In such examples, the conductive agent can be present in an amount of from about 10 to about 35 weight percent of a total weight percent of the polymer-conductive agent composite portion, among other possibilities.

It is to be understood that portions 240 of the polymer build material 216 that do not have the conductive agent 236 and/or the non-conductive fusing agent 237 applied thereto do not become part of the patterned 3D printed polymer-particulate composite 242' that is ultimately formed.

The processes shown in FIGS. 2A through 2C may be completed and repeated to iteratively build up several patterned layers and to form the patterned 3D printed polymer-particulate composite 242'.

FIG. 2D illustrates the initial formation of a second layer of polymer build material 216 on the layer 234 patterned with the conductive agent 236 and the non-conductive fusing agent 237. In FIG. 2D, following deposition of the conductive agent 236 and the non-conductive fusing agent onto predetermined portion(s) 238 of the layer 234 of polymer build material 216, the controller may execute instructions to cause the build area platform 212 to be moved a relatively small distance in the direction denoted by the arrow 220. In other words, the build area platform 212 may be lowered to enable the next layer of polymer build material 216 to be formed. For example, the build material platform 212 may be lowered a distance that is equivalent to the height of the layer 234. In addition, following the lowering of the build area platform 212, the controller may control the build material supply 214 to supply additional polymer build material 216 (e.g., through operation of an elevator, an auger, or the like) and the build material distributor 218 to form another layer of polymer build material 216 on top of the previously formed layer 234 with the additional polymer build material 216. The newly formed layer may be patterned with conductive agent 236 and/or the non-conductive fusing agent 237.

Referring back to FIG. 2C, the layer 234 may be exposed to heating using heater 232' after the conductive agent 236 and the non-conductive fusing agent 237 is applied to the layer 234 and before another layer is formed. The heater 232' may be used for during printing on a layer-by-layer basis, and in combination with sintering for producing a stabilized and 3D printed polymer-particulate composite layer. In this example, the processes shown in FIGS. 2A through 2C (including the heating/sintering of the layer 234) may be repeated to iteratively build up several layers and to produce the 3D printed polymer-particulate composite 242. It will be understood that the heaters 232, 232' can be one or both or a combination of overhead lamp(s) and/or lamps attached to moving carriage(s) (not all options are shown in the figures).

The cycle time when printing layer-by-layer can range from about 5 seconds to about 100 seconds. During this time, a layer of polymer build material 234 is formed, conductive agent 236 and/or the non-conductive fusing agent 237 is delivered to the layer, and heaters 232, 232' heat the surface of the polymer build material to a sintering temperature that fuses the polymer build material and/or the particles (e.g., silver) in the conductive agent 236 in the 3D printed polymer-particulate composite 242 and/or fuses the particulates in the non-conductive fusing agent.

In some examples, layers of polymer build material 216 and conductive agent 236 can be heated and fused on a layer-by-layer basis. It is understood that sintering occurs on a layer by layer basis. However, heat can be applied on a layer by layer basis, every two layers, every three layers, or so forth to form the 3D printed polymer-particulate composite 242.

The patterned 3D printed polymer-particulate composite 242' is a volume of the build material cake 244 that is filled with the polymer build material 216 and the conductive agent 236 and/or the non-conductive fusing agent 237 within the inter-particle spaces. The remainder of the build material cake 244 is made up of the non-patterned polymer build material 216.

It is understood that relative percentages and/or geometries of a polymer-fusing agent composite portion (i.e., a percentage of the patterned 3D printed polymer-particulate composite 242' that is a filled with non-conductive fusing agent 237) and/or a polymer-conductive agent composite portion (i.e., a percentage of the patterned 3D printed polymer-particulate composite 242' that is a filled with conductive agent 236) can be varied depending upon an intended application of the 3D printed polymer-particulate composite 242.

As shown in FIG. 2E, the polymer build material 216 and conductive agent 236 and/or the fusing agent 237 may be exposed to heat or radiation to generate heat, as denoted by the arrows 246. The heat applied may be sufficient to melt in the conductive agent 236 and/or the fusing agent 237 in the patterned 3D printed polymer-particulate composite 242' and to produce a stabilized 3D printed polymer-particulate composite 242.

Heating the patterned 3D printed polymer-particulate composite 242' to a sintering temperature may result in the evaporation of a significant fraction and in some instances all of the liquid from the patterned 3D printed polymer-particulate composite 242'. The evaporated liquid may include any of the fusing agent components. Liquid evaporation may result in some densification, through capillary action, of the patterned 3D printed polymer-particulate composite 242'.

Figure 2F:
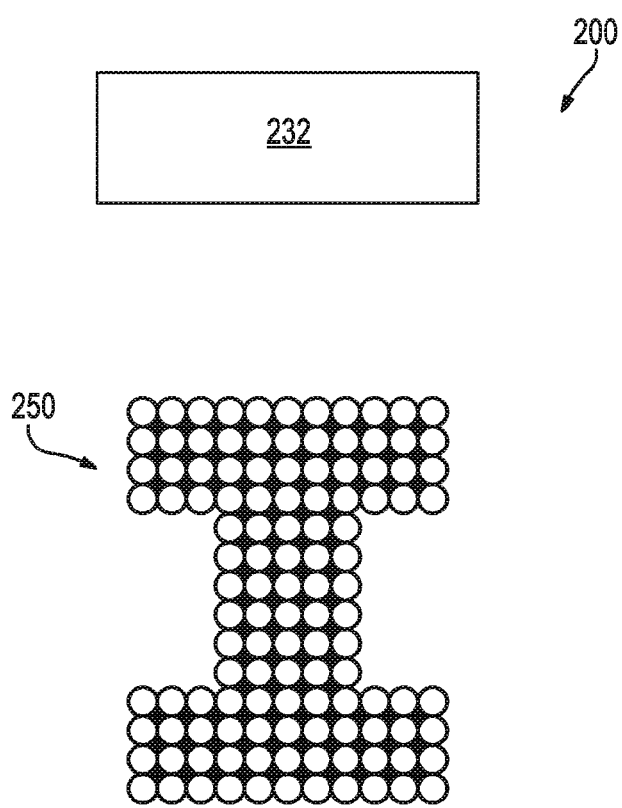

Once sintered; the 3D printed polymer-particulate composite 242 (having a polymer-conductive agent composite portion and a polymer-fusing agent composite portion) may then be extracted from the build material cake 244 to provide the extracted 3D printed polymer-particulate composite 250 (as illustrated in FIG. 2F). The 3D printed polymer-particulate composite 242 may be extracted by other means. In an example, the 3D printed polymer-particulate composite 242 may be extracted by lifting the 3D printed polymer-particulate composite 242 from the unpatterned polymer build material 216. An extraction tool including a piston and a spring may be used.

In some examples, the 3D printed polymer-particulate composite 242 may be cleaned to remove unpatterned polymer build material 216 from its surfaces. In some examples, the 3D printed polymer-particulate composite 242 may be cleaned with a brush and/or an air jet. Some examples of cleaning procedures include rotary tumbling or vibratory agitation, ultrasonic agitation in a liquid, and/or bead blasting, among others.

During heating 246 using heat source 232, the particles from the conductive agent may form a conductive 3D printed polymer-particulate composite 242. That is, heating to sinter is accomplished at a sintering temperature that is sufficient to sinter the particles in the conductive agent 236 and/or the non-conductive fusing agent 237. The sintering temperature is highly dependent at least upon the composition/particle size of the polymer build material 216 and on the composition/particulate size of the conductive agent. During heating/sintering, the 3D printed polymer-particulate composite 242 and/or the patterned 3D printed polymer-particulate composite 242' may be heated to a temperature ranging from about 70% to about 99.9% of the melting point or the solidus, eutectic, or peritectic temperature of the polymer build material 216. In another example, the 3D printed polymer-particulate composite 242 and/or the patterned 3D printed polymer-particulate composite 242' may be heated to a temperature ranging from about 90% to about 95% of the melting point or the solidus, eutectic, or peritectic temperature of the polymer build material 216. In still another example, the 3D printed polymer-particulate composite 242 and/or the patterned 3D printed polymer-particulate composite 242' may be heated to a temperature ranging from about 60% to about 85% of the melting point or the solidus, eutectic, or peritectic temperature of the polymer build material 216. In another example, supersolidus sintering, where T sintering>T solidus but<T liquidus, can be used.

As detailed herein, a sintering temperature can be a temperature in a range of from about 80° C. to about 450° C. It is to be understood that the sintering heating temperature depends upon the polymer build material 216 that is utilized, and may be higher or lower than described in the examples. Heating at a sintering temperature thermally binds at least the conductive particulates in the conductive agent 236 form at least a portion of a completed 3D printed polymer-particulate composite 242. For example, as a result of sintering, the density may go from 50% density to over 90%, and in some cases very close to 100% of the theoretical density. In some examples, heating at a sintering temperature may thermally bind non-conductive particulate of the non-conductive fusing agent 237 with the build material 216 and/or with other non-conductive particulates to form a portion of a completed 3D printed polymer-particulate composite 242. Alternatively or in addition the non-conductive particulates may 'wet' the build material 216 but may not thermally bind with the build material 216.

The length of time at which the heat 246 for sintering is applied and the rate at which the patterned 3D printed polymer-particulate composite 242' or the 3D printed polymer-particulate composite 242 is heated may be dependent, for example, on: characteristics of the heat or radiation source 232, characteristics of the polymer build material 216 (e.g., metal type or particle size), and/or the target characteristics of the 3D printed polymer-particulate composite 242 (e.g., wall thickness).

Figure 3:
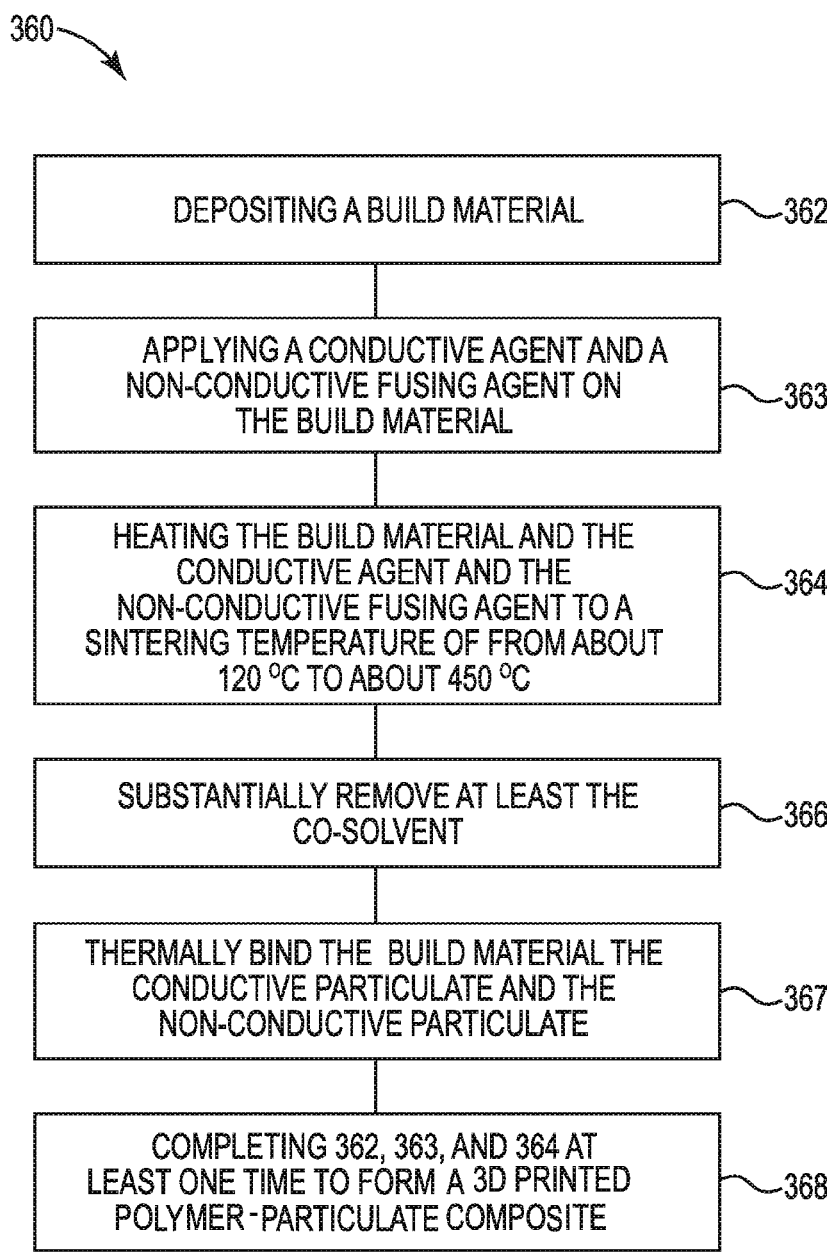
FIG. 3 is a flow diagram illustrating an example of a 3D printing method disclosed herein.

FIG. 3 is a flow diagram illustrating an example of a 3D printing method 360 disclosed herein. In this example, the method 360 of forming a 3D printed polymer-particulate composite can comprise depositing a build material (362); selectively applying a conductive agent and a non-conductive fusing agent on the build material (363); heating the build material and the selectively applied conductive agent and the non-conductive fusing agent to a sintering temperature of from about 120° C. to about 450° C. (364) to: substantially remove at least the co-solvent (366), in some examples remove the water when present, and thermally bind the build material and the selectively applied conductive agent and thermally bind the build material and the selectively applied non-conductive fusing agent (367); and completing (and in some examples repeating) 362, 363, and 364 at least one time to form the 3D printed polymer-particulate composite (368), as detailed herein.

Unless otherwise stated, any feature described hereinabove can be combined with any example or any other feature described herein.

In describing and claiming the examples disclosed herein, the singular forms "a," "an," and "the" include plural referents unless the context clearly dictates otherwise.

It is to be understood that the ranges provided herein include the stated range and any value or sub-range within the stated range. For example, from about 0.5% to about 3% should be interpreted to include from about 0.5% to about 3%, but also to include individual values, such as about 0.8%, about 1.31%, about 2%, about 2.785%, about 2.95%, etc., and sub-ranges, such as from about 0.85% to about 2.35%, from about 1.21% to about 2.95%, from about 1.5% to about 2.35%, etc. Furthermore, when "about" is utilized to describe a value, this is meant to encompass minor variations (up to +/−10%) from the stated value.

Reference throughout the specification to "one example," "some examples," "another example," "an example," and so forth, means that a particular element (e.g., feature, structure, and/or characteristic) described in connection with the example is included in at least one example described herein, and may or may not be present in some examples. In addition, it is to be understood that the described elements for any example may be combined in various manners in the various examples unless the context clearly dictates otherwise.

Unless otherwise stated, references herein to "wt %" of a component are to the weight of that component as a percentage of the whole composition comprising that component. All amounts disclosed herein and in the examples below are in wt % unless indicated otherwise.

If a standard test is mentioned herein, unless otherwise stated, the version of the test to be referred to is the most recent at the time of filing this patent application. To further illustrate the present disclosure, examples are given herein. It is to be understood that these examples are described for illustrative reasons and are not to be construed as limiting the scope of the present disclosure.

Described herein, in some examples, is a method of forming a 3D printed polymer-particulate composite having a polymer-conductive agent composite portion and a polymer-fusing agent composite portion, the method comprising (A) depositing a polymer build material including a polymer;

(B) selectively applying a non-conductive fusing agent including at least one non-conductive particulate and a conductive fusing agent on the polymer build material, the conductive agent comprising:

at least one conductive particulate present in an amount of from about 10% to about 60% of a total weight of the conductive agent;

at least one co-solvent present in an amount of from about 10% to about 50% of a total weight of the conductive agent;

water present in an amount of from about 0% to about 50% of a total weight of the conductive agent; and an additive present in an amount of from about 0% to about 10% of a total weight of the conductive agent, wherein a sum % of the at least one conductive particulate %, the co-solvent %, the water %, and the additive % equal 100% of the total weight of the conductive agent;

(C) heating the polymer build material, the selectively applied conductive agent, and the non-conductive fusing agent to a sintering temperature of from about 80° C. to about 250° C. to:

(a) substantially removing the water and co-solvent, and (b) thermally binding:
  the polymer build material and the at least one conductive particulate;
  the polymer build material and the at least one non-conductive particulate; and (D) completing (A), (B), and (C) at least one time to form the 3D printed polymer-particulate composite.

In some examples, when exposed to changes in environmental conditions (e.g., changes in humidity) the 3D printed polymer-particulate composite has a change in resistivity of about 10 ohms or less, about 7 ohms or less, or about 5 ohms or less across range of relative humidity of from about 20% relative humidity to about 70% relative humidity in accordance with industry standard practice using a climatic chamber, digital multimeter, and data logging software.

In some examples, the sintering temperature is from about 80° C. to about 450° C., 80° C. to about 170° C., 80° C. to about 177° C., or about 120° C. to about 450° C., or from about 120° C. to about 400° C., or from about 120° C. to about 350° C., or from about 120° C. to about 250° C., or from about 120° C. to about 200° C., or from about 120° C. to about 170° C., or from about 130° C. to about 170° C., or from about 140° C. to about 170° C., or from about 150° C. to about 170° C., or from about 160° C. to about 170° C., or less than about 177° C., or less than about 170° C., or less than about 160° C., or less than about 150° C., or less than about 140° C., or at least about 120° C., or at least about 130° C., or at least about 140° C., or at least about 150° C.

In some examples, the melt temperature is from about 90° C. to about 400° C., or from about 90° C. to about 300° C., or from about 90° C. to about 200° C., or from about 90° C. to about 170° C., or from about 175° C. to about 300° C., or from about 180° C. to about 300° C., or from about 190° C. to about 300° C., or from about 175° C. to about 187° C., or from about 200° C. to about 250° C., or less than about 250° C., or less than about 200° C., or less than about 190° C., or less than about 180° C.

Notably, in some examples, a sintering temperature can be below the melting point of the polymer. For example, the polymer build material 116 may have a melting point in a range of from about 175° C. to about 400° C. while the sintering temperature can be a temperature in a range of from about 120° C. to about 170° C., or the polymer build material 116 may have a melting point in a range of from 175° C. to about 187° C. or from about 200° C. to about 250° C. while the sintering temperature can be temperature in a temperature range of from about 120° C. to about 140° C., of from about 130° C. to about 160° C., or from about 140° C. to about 170° C., among other possibilities.

In some examples, (C) heating occurs in an ambient environment. However, in some examples, (C) heating occurs in an environment containing (i) a vacuum or (ii) an inert gas, a low reactivity gas, a reducing gas, or a combination thereof. The inert gas, low reactivity gas, and reducing gas can include but are not limited to helium, argon, neon, xenon, krypton, nitrogen, hydrogen, carbon monoxide and combinations thereof.

To further illustrate the present disclosure, examples are given herein. It is to be understood these examples are provided for illustrative purposes and are not to be construed as limiting the scope of the disclosure.

EXAMPLES

Example 1

Example 3D printed polymer-particulate composites were printed using a polymer build material and a conductive agent having the components as shown in Table 1 and that is commercially available under the tradename Metalon® from Novacentrix®. However, it is understood that conductive agents can be formed by combining amounts of individual components such as co-solvent, conductive particulates, water, and/or other components. For example, a given amount of conductive particulate can be admixed into a solution of co-solvent and/or water to form a conductive agent. In some examples, additives or other components may be added to the solution including the conductive particulates. That is, while Example 1 references a commercially available conductive particulate the present disclosure is not so limited.

TABLE 1

| Components | Example conductive agent (wt %) |
|---|---|
| Co-solvent (diethylene glycol) | 50 |
| Conductive particulate (silver) | 41 |
| Water | Balance |

The 3D printed polymer-particulate composites were formed by successively spreading 100 um thick layers of polymer build material, followed by depositing printed areas of conductive agent and non-conductive fusing agent. The conductive agent and non-conductive fusing agent were applied by thermal inkjet, using 1-10 pass printing per layer, and after application the entire layer fused. The bottom surface of the polymer bed was maintained at ~177° C. by resistive heaters, and surface temperature of the build layers maintained between 90 C-177° C. Consecutive layers were printed and then fused through the application of radiation via overhead halogen lamps. The 3D printed metal object was then extracted from the unpatterned polymer build material and cleaned of unfused polymer material, No further processing was performed. While the conductive agents were applied by thermal inkjet, but other forms of agent delivery, such as piezoelectric inkjet or continuous inkjet, could be employed.

3D printed polymer-particulate composites (i.e., SLS coupons) of approximately 20 millimeters wide were formed in accordance with the procedure above. In some examples, the SLS coupons were heated on a hotplate in air for 50 minutes at a temperature that evaporated substantially all of the liquid components (water and co-solvent), In some examples, the SLS coupons were heated for five to twenty second using an overhead halogen light. It is understood the various other curing methods/equipment (hot plate, halogen light, over, etc) or possible.

Comparative Examples 1-5

Example 3D printed polymer-particulate composites and 3D printed polymer-particulate composites were printed and formed using the methodology of Example 1 but instead employed the conductive agents of Comparative Examples 1-5 having the properties as shown in Table 2 and that are commercially available as under the tradename Metalon® from Novacentrix ohms/centimeter at about 50% relative humidity, a resistivity of about 129 ohms/centimeter at about 60% relative humidity, and a resistivity of about 127 ohms/centimeter at about 70% relative humidity, among other possibilities. Without wishing to be bound by theory, it is believed that the high amount of conductive particulates (e.g., 40 wt %) contributes to the particular electrical characteristics in contrast to other approaches that employ less conductive particulates and/or do not employ conductive particulates.

Moreover, printing tests were performed on each of the conductive agents provided in Comparative Examples 1-5 and in Example 1. The printing tests (printing test 1 and printing test 2) refer generally to printing tests conducted with several architectures. Printing test 1 employed a ther-

TABLE 2

|  | Comparative Example (CE) 1 | CE 2 | Example 1 | CE 3 | CE 4 | CE 5 |
| --- | --- | --- | --- | --- | --- | --- |
| Specific gravity | 1.58 | 1.56 | 1.63 | 1.30 | 1.30 | 1.56 |
| Surface tension | 17.8 | 28 | 18.4 | 27.7 | 29.3 | 28.2 |
| pH: | 6.6 | 3.5 | 6.7 | 7.5 | 7.3 | 7.1 |
| Particle size | 67 nm | 40-60 nm | 39 nm | 63 nm | 67 nm | 54 nm |
| % Solids | not tested | 40.9 | 40.8 | 25.0 | 25.0 | 40.0 |
| Cosolvent | DEGMBE | DEGMBE | DEG | EG | EG | DEGMBE |
| Printing tests (1 and 2) | Fail: 1 | Fail: 2 | Pass: 1 and 2 | Fail: 1 | Fail: 1 | Fail: 2 |
| Conductivity (mS/cm) | Fail [∞ (i.e. open)] | Fail [∞ (i.e. open)] | Pass [provide values] | Fail [∞ (i.e. open)] | Fail [∞ (i.e. open)] | Fail [∞ (i.e. open)] |
| Curing Conditions: | Not tested | Not tested | 140° C. bake | 250° C. or greater bake | 250° C. or greater bake | 180° C. or greater bake |

Notably, Example 1 shows that the 3D printed polymer-particulate composites formed with the conductive agent and the non-conductive fusing agent of Example 1 exhibit various electrical characteristics (taken across portions of the conductive agent). For instance, the conductivity of the polymer-conductive agent composite portion each of the 3D printed polymer-particulate composites from Example 1 and Comparative Examples 1-5 was tested. The results of the conductivity tests are summarized in Table 2 above. Example 1 passed the conductivity test (passing considered to be an exposed trace having a surface probed resistivity of less than 1 kiloohm/centimeter) while each of the Comparative Examples failed the conductivity test.

Figure 4:
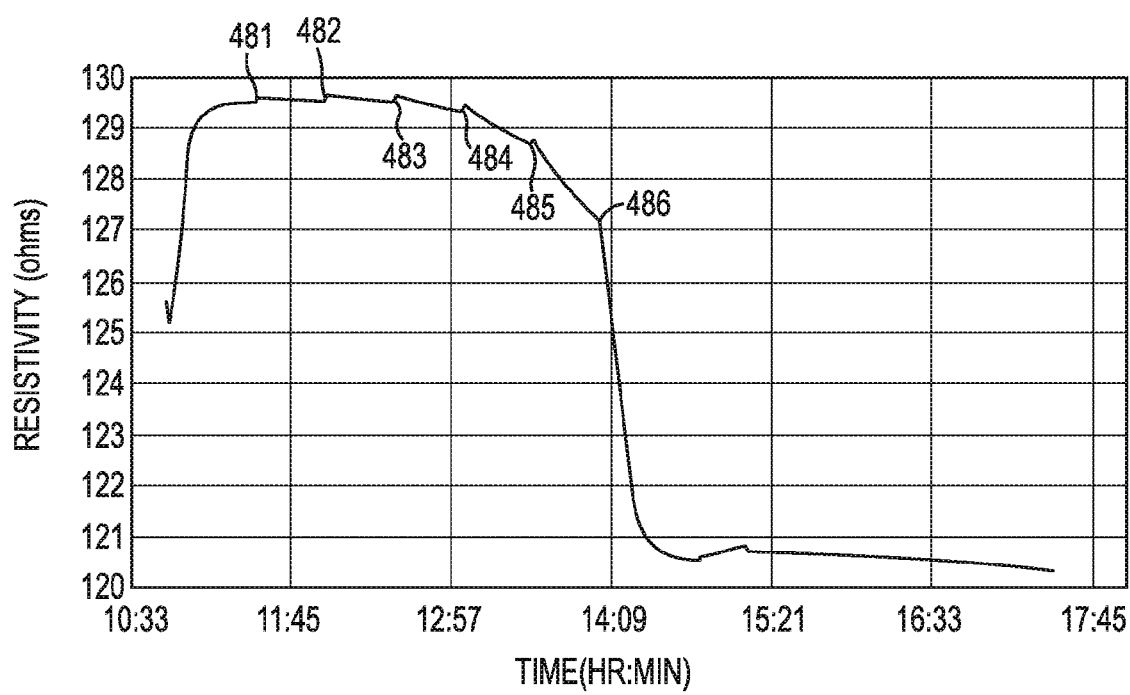
FIG. 4 is a graph illustrating resistivity of a polymer-conductive agent composite portion of a 3D printed polymer-particulate composite disclosed herein.

FIG. 4 is a graph showing resistivity of the polymer-conductive agent composite portion of a 3D printed polymer-particulate composite of Example 1. The resistivity of polymer-conductive agent composite portion the 3D printed polymer-particulate composite of Example 1 was tested at a constant temperature of about 50° C. and incrementally increased relative humidity values of from 20% (at 481 as illustrated in FIG. 4), 30% (at 482 as illustrated in FIG. 4), 40% (at 483 as illustrated in FIG. 4), 50% (at 484 as illustrated in FIG. 4), 60% (at 485 as illustrated in FIG. 4), and 70% (at 486 as illustrated in FIG. 4), relative humidity over a period of time.

FIG. 4 demonstrates that Example 1 exhibits a humidity stability by maintaining a resistivity within +/−5 ohms/centimeter across a range of relative humidity values from 20% relative humidity to 70% relative humidity. For example, the 3D printed polymer-particulate composite of Example 1 exhibited a resistivity of about 125 ohms/centimeters at about 20% relative humidity, a resistivity of about 129 ohms/centimeter at about 30% relative humidity, a resistivity of about 129 ohms/centimeter at about 40% relative humidity, a resistivity of about 129 ohms/centimeter at about 40% relative humidity, a resistivity of about 129 mal inkjet dispensing unit with conductive agents fired initially at a dropweight of approximately 50 nanograms and subsequently at a dropweight of approximately 100 nanograms. Visual examination of the resultant drops and printed areas formed with the conductive agents revealed whether the agents passed or failed printing test 1. Printing test 2 employed a different printing architecture commercially available in 8000 series of printers from Hewlett-Packard™. Printing test 2 was performed at a dropweight of approximately 10 nanograms. Visual examination of the resultant drops and printed areas formed with the conductive agents revealed whether the agents passed or failed printing test 2. As illustrated in Table 2 above, Example 1 passed both of printing test 1 and printing test 2. However, the Comparative Examples 1-5 failed at least one of the printing tests. That is, the printability of the Example 1 is enhanced as compared to each of the Comparative Examples 1-5.

While not wishing to be bound to theory, it is believed that the differences in at least particle size, percent solids, and/or co-solvent type contribute to the enhanced printability of Example 1. Example 1 therefore provides a composition employable for 3D printing and provides for a 3D printed polymer-particulate composite that can be employed as an conductive trace/circuit board (e.g. due to having particular electrical characteristics).

In some examples, the conductive agent of Example 1, due to its relatively high amount of solids in the form of the conductive particulates can be selected to provide enhanced processing/creation of 3D printed polymer-particulate composites such as having faster dry times for the liquids in the conductive agent to be substantially removed as compared to other agents that may have a relatively higher percentage of liquids and/or a relatively lower number of solids.

Prophetic Examples 1-18 providing compositions for three-dimensional (3D) printing are prophetic. The difference between Prophetic examples 1-18 and Example 1 is that a type of conductive particulate used in Prophetic examples 1-18 is varied instead of the conductive particulate type (silver) of Example 1. As such, similar results for Prophetic examples 1-18 are expected.

Prophetic Example 1

Repeat the procedure in Example 1, except instead of using the conductive agent including silver conductive particulates, use a conductive agent including brass conductive particulates having about the same particulate size, about the same particulate wt % of a total weight of the conductive agent, and with the same co-solvent as employed in Example 1.

Prophetic Example 2

Repeat the procedure in Example 1, except instead of using the conductive agent including silver conductive particulates, use a conductive agent including zinc conductive particulates having about the same particulate size, about the same particulate wt % of a total weight of the conductive agent, and with the same co-solvent as employed in Example 1.

Prophetic Example 3

Repeat the procedure in Example 1, except instead of using the conductive agent including silver conductive particulates, use a conductive agent including aluminum conductive particulates having about the same particulate size, about the same particulate wt % of a total weight of the conductive agent, and with the same co-solvent as employed in Example 1.

Prophetic Example 4

Repeat the procedure in Example 1, except instead of using the conductive agent including silver conductive particulates, use a conductive agent including nickel conductive particulates having about the same particulate size, about the same particulate wt % of a total weight of the conductive agent, and with the same co-solvent as employed in Example 1.

Prophetic Example 5

Repeat the procedure in Example 1, except instead of using the conductive agent including silver conductive particulates, use a conductive agent including cobalt conductive particulates having about the same particulate size, about the same particulate wt % of a total weight of the conductive agent, and with the same co-solvent as employed in Example 1.

Prophetic Example 6

Repeat the procedure in Example 1, except instead of using the conductive agent including silver conductive particulates, use a conductive agent including iron conductive particulates having about the same particulate size, about the same particulate wt % of a total weight of the conductive agent, and with the same co-solvent as employed in Example 1.

Prophetic Example 7

Repeat the procedure in Example 1, except instead of using the conductive agent including silver conductive particulates, use a conductive agent including gold conductive particulates having about the same particulate size, about the same particulate wt % of a total weight of the conductive agent, and with the same co-solvent as employed in Example 1.

Prophetic Example 8

Repeat the procedure in Example 1, except instead of using the conductive agent including silver conductive particulates, use a conductive agent including platinum conductive particulates having about the same particulate size, about the same particulate wt % of a total weight of the conductive agent, and with the same co-solvent as employed in Example 1.

Prophetic Example 9

Repeat the procedure in Example 1, except instead of using the conductive agent including silver conductive particulates, use a conductive agent including copper conductive particulates having about the same particulate size, about the same particulate wt % of a total weight of the conductive agent, and with the same co-solvent as employed in Example 1.

Prophetic Example 10

Repeat the procedure in Example 1, except instead of using the conductive agent including silver conductive particulates, use a conductive agent including chromium conductive particulates having about the same particulate size, about the same particulate wt % of a total weight of the conductive agent, and with the same co-solvent as employed in Example 1.

Prophetic Example 11

Repeat the procedure in Example 1, except instead of using the conductive agent including silver conductive particulates, use a conductive agent including manganese conductive particulates having about the same particulate size, about the same particulate wt % of a total weight of the conductive agent, and with the same co-solvent as employed in Example 1.

Prophetic Example 12

Repeat the procedure in Example 1, except instead of using the conductive agent including silver conductive particulates, use a conductive agent including molybdenum conductive particulates having about the same particulate size, about the same particulate wt % of a total weight of the conductive agent, and with the same co-solvent as employed in Example 1.

Prophetic Example 13

Repeat the procedure in Example 1, except instead of using the conductive agent including silver conductive particulates, use a conductive agent including tin conductive particulates having about the same particulate size, about the same particulate wt % of a total weight of the conductive agent, and with the same co-solvent as employed in Example 1.

Prophetic Example 14

Repeat the procedure in Example 1, except instead of using the conductive agent including silver conductive particulates, use a conductive agent including carbon black conductive particulates having about the same particulate size, about the same particulate wt % of a total weight of the conductive agent, and with the same co-solvent as employed in Example 1.

Prophetic Example 15

Repeat the procedure in Example 1, except instead of using the conductive agent including silver conductive particulates, use a conductive agent including graphene conductive particulates having about the same particulate size, about the same particulate wt % of a total weight of the conductive agent, and with the same co-solvent as employed in Example 1.

Prophetic Example 16

Repeat the procedure in Example 1, except instead of using the conductive agent including silver conductive particulates, use a conductive agent including graphite conductive particulates having about the same particulate size, about the same particulate wt % of a total weight of the conductive agent, and with the same co-solvent as employed in Example 1.

Prophetic Example 17

Repeat the procedure in Example 1, except instead of using the conductive agent including silver conductive particulates, use a conductive agent including carbonaceous conductive particulates having about the same particulate size, about the same particulate wt % of a total weight of the conductive agent, and with the same co-solvent as employed in Example 1.

Prophetic Example 18

Repeat the procedure in Example 1, except instead of using the conductive agent including silver conductive particulates, use a conductive agent including polymer conductive particulates having about the same particulate size, about the same particulate wt % of a total weight of the conductive agent, and with the same co-solvent as employed in Example 1.

As mentioned, Prophetic Examples 1-18 providing compositions for three-dimensional (3D) printing are prophetic. The difference between Prophetic Examples 1-18 and Example 1 is that a type of conductive particulate used in Prophetic Examples 1-18 is varied instead of the conductive particulate type (silver) of Example 1. As such, similar results for Prophetic Examples 1-18 are expected. For instance, it is expected that each of Prophetic Examples 1-18 will pass both printing test 1 and printing test 2.

Example 2

A printed polymer-particulate composite was prepared using the conductive agent of Table 1 to form a polymer-conductive agent composite portion 570 of the printed polymer-particulate composite. Printing was performed with a testbed 3D printer. Nylon 12 powder was used as the build material. Parts were designed and input into the printer such that 1 cm diameter conductive portions were printed within a 2×6.5 cm pad. These geometries were repeated for each consecutive about 100 micron layer to create an about 2 mm height part. The printing temperature was set at 165 C°. 4 passes of fusing lamps were used with carriage speeds at 10 inches per second for each. Non-conductive fusing agent was applied during the first 2 passes, with contone levels at 16 CL of fusing agent for the non-conductive portion, and a contone level of 320, 600, 800, and 1020 CL of conducive agent placed in the 4 different pucks within the printed part. 10 cooling layers (build material) were printed on top of the formed part.

Figure 5A:
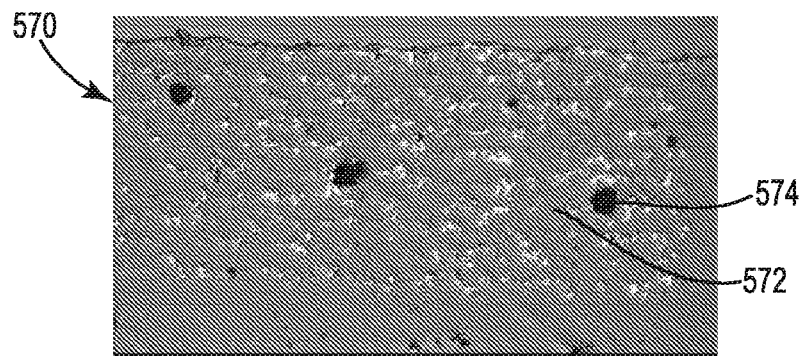
FIGS. 5A and 5B illustrates examples of different degrees of fusing of a build material having different amounts of conductive agent as disclosed herein.

Following sintering, a cross-section taken along the polymer-conductive agent composite portion 570 was taken. As depicted in FIG. 5A, visual inspection of the cross-section of the polymer-conductive agent composite portion 570 revealed the polymer build material 572 was substantially fused and the conductive agent 574 was sintered.

Example 3

Figure 5B:
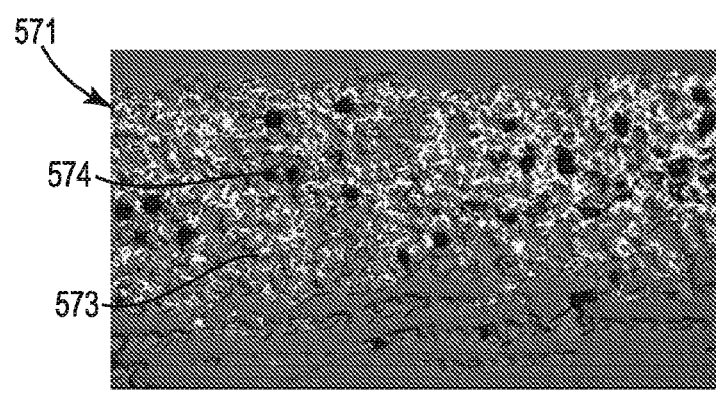

Example 3 was prepared in accordance with Example 2 but with more conductive agent (e.g., 13.2 weight percent conductive agent of a total weight of a polymer-conductive agent composite portion 571 of a printed polymer-particulate composite). As depicted in FIG. 5B, visual inspective of the cross-section of the polymer-conductive agent composite portion 574 of Example 3 revealed the polymer build material 573 remained substantially unfused due to the higher amount of conductive agent particulate 574 while the conductive agent 574 was sintered.

Examples 2 and 3 together demonstrate varying an amount of the selectively applied conductive agent can vary a degree of fusing of the polymer build material depending upon whether the polymer build material is to be substantially fused, substantially partially fused, or remain substantially unfused for a given application.

Examples 4-7

Figure 6:
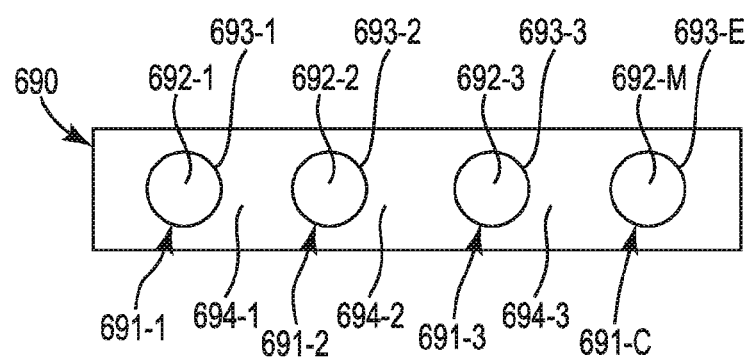
FIG. 6 illustrate an example of a 3D printed polymer-particulate composite as disclosed herein.

Examples 4-7 each employed a polymer build material, a conductive agent, and a fusing agent to form 3D printed polymer-particulate composite similar to the 3D printed polymer-particulate composite 690 illustrated in FIG. 6. That is, FIG. 6 illustrate an example of a 3D printed polymer-particulate composite as disclosed herein.

For each of Examples 4-7-25 a 3D printed polymer-particulate composite was prepared utilizing a large format printer by applying an amount of conductive agent from Table 1 sufficient to form a resultant polymer-conductive agent composite portion having about 32.7% weight percent of a total weight of the polymer-conductive agent composite portion formed of conductive particulates and applying an amount of amount of non-conductive fusing agent sufficient to form the non-conductive portion.

Each of Examples 4-7 formed a part similar to part 690 having a total of four pucks (691-1, 691-2, 691-3, 691-C) of 3D printed polymer-particulate composite having a polymer-conductive agent composite portion including a center portion (692-1, 692-2, 692-3, and 692-M respectively) and an edge portion (693-1, 693-2, 693-3, and 693-E, respectively). The four pucks are surrounded by a polymer build material (694-1, 694-2, 694-3) which forms a polymer-fusing agent composite portion. A demonstrated in Table 3, each of the four pucks has a hardness that is greater than the hardness of the polymer build material (i.e., reference material) surrounding the pucks. For instance, the polymer-conductive agent composite portion can have a hardness (as measured at the center and/or edge) that is of from about 1%, about 2%, about 3%, about 4%, about 5%, about 6%, about 7%, about 8%, about 9% and/or about 10% greater than a hardness (as measured in accordance with ASTM D2240) of a polymer-fusing agent composite portion (reference material). For instance, in some examples, a polymer-conductive agent composite portion can have a hardness as measured in accordance with ASTM D2240 that is at least about 3 percent greater than a hardness of the polymer-fusing agent composite portion and/or the polymer-conductive agent composite portion can have a hardness as measured in accordance with ASTM D2240 that is at least about 5 percent greater than a hardness of the polymer-fusing agent composite portion, among other possibilities.

TABLE 3

| Position | WE 22 Hardness | WE 23 Hardness | WE 24 Hardness | WE 25 Hardness |
|---|---|---|---|---|
| 692-1 (center) | 89.8 | 92.6 | 91.4 | 91.2 |
| 693-1 (edge) | 91.4 | 95 | 93.4 | 94.1 |
| 694-1 (reference) | 87.8 | 87.9 | 90.1 | 86.5 |
| 692-2 (center) | 93.3 | 92.2 | 91.2 | 92.1 |
| 693-2 (edge) | 95 | 96.4 | 96.8 | 98.1 |
| 694-2 (reference) | 87.3 | 87.3 | 89.4 | 85.7 |
| 692-3 (center) | 96.7 | 98.1 | 97.1 | 97.9 |
| 693-3 (edge) | 98.4 | 98.6 | 98.9 | 99.3 |
| 694-3 (reference) | 88.7 | 88.9 | 89 | 76.9 |
| 692-4 (center) | 96.6 | 98.5 | 98.5 | 88.7 |
| 693-4 (edge) | 96.8 | 97.1 | 97.3 | 85.1 |

While several examples have been described in detail, it is to be understood that the disclosed examples may be modified. Therefore, the foregoing description is to be considered non-limiting. As used herein, "(s)" at the end of some terms indicates that those terms/phrases may be singular in some examples or plural in some examples. It is to be understood that the terms without "(s)" may be also be used singularly or plurally in many examples.

What is claimed is:

1. A composition for three-dimensional (3D) printing comprising:
   a polymer build material; and
   a non-conductive fusing agent dispensable onto the polymer build material to form a polymer-fusing agent composite portion when heated to a sintering temperature;
   a conductive agent dispensable onto on the polymer build material to form a polymer-conductive agent composite portion when heated at least to the sintering temperature, the conductive agent comprising:
      at least one conductive particulate present in an amount of from about 10% to about 60% of a total weight of the conductive agent;
      at least one co-solvent present in an amount of from about 10% to about 50% of a total weight of the conductive agent; and
      an additive present in an amount of from about 0% to about 10% of a total weight of the conductive agent.

2. The composition of claim 1, wherein the at least one conductive particulate is selected from a group consisting of brass, zinc, aluminum, nickel, cobalt, iron, gold, silver, platinum, copper, chromium, manganese, molybdenum, tin, carbon black, graphene, graphite, conductive carbonaceous materials, a conductive polymer, and combinations thereof.

3. The composition of claim 1, wherein the at least one conductive particulate is present in an amount of from about 10% to about 45% of a total weight of the conductive agent.

4. The composition of claim 1, wherein the at least one conductive particulate comprises metal particles having a Z-average particle size of from about 20 nanometers to about 70 nanometers as determined by Malvern dynamic light scattering.

5. The composition of claim 1, wherein the polymer build material further comprises a semi-crystalline thermoplastic material having a processing window of greater than 5° C.

6. The composition of claim 1, wherein the co-solvent is selected from a group consisting of 2-pyrrolidinone, hydroxyethyl-2-pyrrolidone, diethylene glycol, 2-(2-Butoxyethoxy)ethan-1-ol, 2-methyl-1,3-propanediol, tetraethylene glycol, tripropylene glycol methyl ether, dipropylene glycol methyl ether, tripropylene glycol butyl ether, dipropylene glycol butyl ether, triethylene glycol butyl ether, 1,2-hexanediol, 2-hydroxyethyl pyrrolidinone, 2-hydroxyethyl-2-pyrrolidinone, 1,6-hexanediol, and combinations thereof.

7. The composition of claim 1, wherein non-conductive fusing agent further comprises a non-conductive particulate is selected from a group consisting of near-IR absorbing dye, near-IR absorbing pigment, and combinations thereof.

8. The composition of claim 1, wherein conductive agent and the polymer build material are each substantially free of pretreat agents.

9. A method of forming a 3D printed polymer-particulate composite having a polymer-conductive agent composite portion and a polymer-fusing agent composite portion, the method comprising:
   (A) depositing a polymer build material;
   (B) selectively applying a non-conductive fusing agent including at least one non-conductive particulate and a conductive agent on the polymer build material, the conductive agent comprising:
      at least one conductive particulate present in an amount of from about 10% to about 60% of a total weight of the conductive agent;
      at least one co-solvent present in an amount of from about 10% to about 50% of a total weight of the conductive agent;
      water present in an amount of from about 0% to about 50% of a total weight of the conductive agent; and
      an additive present in an amount of from about 0% to about 10% of a total weight of the conductive agent, wherein a sum % of the at least one conductive particulate %, the co-solvent %, the water %, and the additive % equal 100% of the total weight of the conductive agent;
   (C) heating the polymer build material, the selectively applied conductive agent and the non-conductive fusing agent to a sintering temperature of from about 80° C. to about 450° C. to:
      (a) substantially removing at least the co-solvent, and
      (b) thermally binding:
         the polymer build material and the at least one conductive particulate; and
         the polymer build material and the at least one non-conductive particulate; and
   (D) completing (A), (B), and (C) at least one time to form a 3D printed polymer-particulate composite.

10. The method of claim 9, wherein the sintering temperature of the at least one conductive particulate is below a melt temperature of the polymer build material.

11. The method of claim 9, wherein the melt temperature of the polymer build material is a temperature in a range of from about 175° C. to about 400° C.

12. The method of claim 11, wherein the sintering temperature of the at least one conductive particulate further comprises a temperature in a range of from about 120° C. to about 170° C.

13. The method of claim 9, further comprising selectively applying the conductive agent in an amount to cause the polymer build material of the polymer-conductive agent composite portion to:
- substantially fuse responsive to heating to the sintering temperature;
- substantially partially fuse responsive to heating to the sintering temperature; or
- remain substantially unfused responsive to heating to the sintering temperature.

14. A three-dimensional printing composition comprising:
a polymer build material; and
a conductive agent including at least one conductive particulate dispensable onto the polymer build material to form a polymer-conductive agent composite portion of a 3D printed polymer-particulate composite when heated to a sintering temperature, the at least one conductive particulate present in an amount of from about 10 to about 60 weight percent of a total weight of the polymer-conductive agent composite portion,
wherein the polymer build material is present in an amount of from about 5 to about 90 weight percent of the total weight of the polymer-conductive agent composite portion, and wherein the polymer-conductive agent composite portion has a hardness as measured in accordance with ASTM D2240 that is equal to or greater than a hardness of a polymer-fusing agent composite portion.

15. The composition of claim 14, wherein the polymer-conductive agent composite portion has a hardness as measured in accordance with ASTM D2240 that is at least about 3 percent greater than a hardness of the polymer-fusing agent composite portion.

* * * * *